US 11,256,918 B2

(12) United States Patent
Lin et al.

(10) Patent No.: US 11,256,918 B2
(45) Date of Patent: *Feb. 22, 2022

(54) OBJECT DETECTION IN IMAGES

(71) Applicant: Adobe Inc., San Jose, CA (US)

(72) Inventors: Zhe Lin, Fremont, CA (US); Xiaohui Shen, San Jose, CA (US); Mingyang Ling, San Jose, CA (US); Jianming Zhang, Campbell, CA (US); Jason Wen Yong Kuen, San Jose, CA (US)

(73) Assignee: Adobe Inc., San Jose, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/874,114

(22) Filed: May 14, 2020

(65) Prior Publication Data

US 2020/0272822 A1   Aug. 27, 2020

Related U.S. Application Data

(63) Continuation of application No. 16/189,805, filed on Nov. 13, 2018, now Pat. No. 10,755,099.

(51) Int. Cl.
*G06K 9/00* (2006.01)
*G06K 9/62* (2006.01)
*G06N 3/04* (2006.01)

(52) U.S. Cl.
CPC ..... *G06K 9/00671* (2013.01); *G06K 9/00201* (2013.01); *G06K 9/6256* (2013.01); *G06N 3/04* (2013.01)

(58) Field of Classification Search
CPC .......... G06K 9/00671; G06K 9/00201; G06K 9/6256; G06N 3/04
See application file for complete search history.

(56) References Cited

U.S. PATENT DOCUMENTS

| | | | |
|---|---|---|---|
| 10,026,020 B2* | 7/2018 | Jin | G06K 9/66 |
| 10,366,166 B2* | 7/2019 | Yu | G06N 3/0445 |
| 10,430,946 B1* | 10/2019 | Zhou | G06N 3/0454 |

(Continued)

OTHER PUBLICATIONS

"Combined Search and Examination Report", GB Application No. 1912054.2, dated Feb. 19, 2020, 6 pages.

(Continued)

*Primary Examiner* — Utpal D Shah
(74) *Attorney, Agent, or Firm* — FIG. 1 Patents

(57) ABSTRACT

In implementations of object detection in images, object detectors are trained using heterogeneous training datasets. A first training dataset is used to train an image tagging network to determine an attention map of an input image for a target concept. A second training dataset is used to train a conditional detection network that accepts as conditional inputs the attention map and a word embedding of the target concept. Despite the conditional detection network being trained with a training dataset having a small number of seen classes (e.g., classes in a training dataset), it generalizes to novel, unseen classes by concept conditioning, since the target concept propagates through the conditional detection network via the conditional inputs, thus influencing classification and region proposal. Hence, classes of objects that can be detected are expanded, without the need to scale training databases to include additional classes.

20 Claims, 10 Drawing Sheets

(56) References Cited

U.S. PATENT DOCUMENTS

| | | | | |
|---|---|---|---|---|
| 10,552,968 | B1* | 2/2020 | Wang | G06K 9/6271 |
| 10,755,099 | B2 | 8/2020 | Lin et al. | |
| 2017/0124432 | A1* | 5/2017 | Chen | G06F 40/30 |
| 2017/0206435 | A1* | 7/2017 | Jin | G06F 16/5866 |
| 2017/0206465 | A1* | 7/2017 | Jin | G06N 20/00 |
| 2017/0308770 | A1* | 10/2017 | Jetley | G06K 9/4671 |
| 2017/0344884 | A1* | 11/2017 | Lin | G06N 3/084 |
| 2018/0181592 | A1* | 6/2018 | Chen | G06F 16/5838 |
| 2018/0210874 | A1* | 7/2018 | Fuxman | G06F 40/35 |
| 2018/0267996 | A1 | 9/2018 | Lin et al. | |
| 2018/0350459 | A1* | 12/2018 | Yang | G16H 30/40 |
| 2019/0073353 | A1* | 3/2019 | Yu | G06F 40/211 |
| 2019/0236136 | A1* | 8/2019 | Sigal | G06F 40/216 |
| 2019/0325243 | A1* | 10/2019 | Sikka | G06N 3/0454 |
| 2020/0057805 | A1* | 2/2020 | Lu | G06F 40/30 |
| 2020/0151448 | A1 | 5/2020 | Lin et al. | |

OTHER PUBLICATIONS

"Notice of Allowance", U.S. Appl. No. 16/189,805, filed Apr. 15, 2020, 8 pages.
Ba,"Predicting Deep Zero-Shot Convolutional Neural Networks Using Textual Descriptions", Sep. 25, 2015, 15 pages.
Bansal,"Zero-Shot Object Detection", Jul. 27, 2018, 17 pages.
Bilen,"Weakly Supervised Deep Detection Networks", Dec. 19, 2016, 9 pages.
Chollet,"Information-theoretical label embeddings for large-scale image classification", Jul. 19, 2016, 10pages.
Church,"Word Association Norms, Mutual Information, and Lexicography", Computational Linguistics, 16(1), Available at <http://www.ldc.upenn.edu/acl/J/J90/J90-1003.pdf>, Mar. 1990, pp. 22-29.
Deng,"ImageNet: A Large-Scale Hierarchical Image Database", In Proceedings of IEEE Conference on Computer Vision and Pattern Recognition, Jun. 20, 2009, 8 pages.
Deutsch,"Zero Shot Learning via Multi-Scale Manifold Regularization", 2017 IEEE Conference on Computer Vision and Pattern Recognition (CVPR), Nov. 2017, pp. 7112-7119.
Everingham,"The PASCAL Visual Object Classes (VOC) Challenge", International journal of computer vision, vol. 88, No. 2, Sep. 9, 2009, 34 pages.
Frome,"DeViSE: A Deep Visual-Semantic Embedding Model", In Neural Information Processing Systems, 2013, 11 pages.
Glorot,"Deep Sparse Rectifie Neural Networks", Jan. 2011, 9 pages.
He,"Deep Residual Learning for Image Recognition", Proceedings of the IEEE conference on computer vision and pattern recognition, 2016., Dec. 10, 2015, 12 pages.
He,"Mask R-CNN", In Proceedings of the IEEE International Conference on Computer Vision, Jan. 24, 2018, 12 pages.
Ioffe,"Batch Normalization: Accelerating Deep Network Training by Reducing Internal Covariate Shift", Mar. 2015, 11 pages.
Jayaraman,"Zero-Shot Recognition with Unreliable Attributes", Mar. 29, 2016, 12 pages.
Jie,"Deep Self-Taught Learning forWeakly Supervised Object Localization", Apr. 30, 2017, 9 pages.
Lampert,"Attribute-Based Classification for Zero-Shot Visual Object Categorization", Mar. 2014, 14 pages.
Li,"Weakly Supervised Object Localization with Progressive Domain Adaptation", Jun. 2016, 9 pages.
Lin,"Microsoft COCO: Common Objects in Context", Computer Vision and Pattern Recognition, May 1, 2014, 16 pages.
Loshchilov,"SGDR: Stochastic Gradient Descent with Warm Restarts", May 3, 2017, 16 pages.
Parikh,"Relative Attributes", ICCV'11 Proceedings of the 2011 International Conference on Computer Vision, Nov. 2011, 8 pages.
Redmon,"YOLO9000: Better, Faster, Stronger", Dec. 25, 2016, 9 pages.
Ren,"Faster R-CNN: Towards Real-Time Object Detection with Region Proposal Networks", arXiv preprint arXiv: 1506.01497v2, Sep. 13, 2015, 10 pages.
Ren,"Faster R-CNN: Towards Real-Time Object Detection with Region Proposal Networks", Apr. 29, 2017, 24 pages.
Simonyan,"Very deep convolutional networks for large-scale image recognition", In Journal of Computing Research Repository, Sep. 2014, 14 pages.
Singh,"R-FCN-3000 at 30fps: Decoupling Detection and Classification", Dec. 5, 2017, 11 pages.
Wang,"Multi-attention Network for One Shot Learning", Jul. 2017, 9 pages.
Xian,"Latent Embeddings for Zero-shot Classification", Apr. 10, 2016, 14 pages.
Yang,"A Faster Pytorch Implementation of Faster R-CNN", Retrieved at https://github.com/jiasenlu/faster-rcnn.pytorch—on Aug. 1, 2018, 2017, 6 pages.
Zhang,"Top-down Neural Attention by Excitation Backprop", In European Conference on Computer Vision, Aug. 2016, 21 pages.
Zhou,"Learning Deep Features for Discriminative Localization", Dec. 14, 2015, 10 pages.
Zhu,"Soft Proposal Networks for Weakly Supervised Object Localization", Sep. 6, 2017, 10 pages.
"Corrected Notice of Allowability", U.S. Appl. No. 16/189,805, filed May 27, 2020, 5 pages.
"Foreign Notice of Acceptance", AU Application No. 2019222819, dated Jul. 20, 2021, 4 pages.
"Foreign Office Action", AU Application No. 2019222819, dated Jun. 21, 2021, 4 pages.

* cited by examiner

OBJECT DETECTION IN IMAGES

This application is a continuation of and claims priority to U.S. patent application Ser. No. 16/189,805, filed Nov. 13, 2018, entitled "Object Detection In Images", the entire disclosure of which is hereby incorporated by reference herein in its entirety.

BACKGROUND

Object detectors detect objects in images, such as with an adaptive model (e.g., a machine learning model, neural network, and the like) that has been trained with a dataset of images. Performance of the object detectors is usually limited to detection of objects belonging to categories that are included within the dataset of images used to train the adaptive model, referred to as "seen" classes or categories. Hence, an object detector may be able to detect a dog in an image, but unable to detect a tree in the image, when the training dataset includes a dog category and not a tree category.

In some cases, object detectors bias their detection results towards seen classes, such as an object category of a training dataset that is closest to a target category. For instance, an object detector may detect a fox in an image as a dog when the training dataset includes a dog category and not a fox category.

Furthermore, some object detectors, such as zero-shot detectors, may try to transfer knowledge from object categories of a training dataset (e.g., seen classes) to object categories not included in the training dataset (e.g., unseen classes). However, these object detectors are limited to transferring knowledge from seen to unseen classes strictly for classification purposes, rather than object detection and region proposal purposes. Hence, these object detectors often fail to detect regions of images for objects of unseen classes.

To overcome these shortcomings of object detectors, a training dataset of images could be scaled to include additional categories (e.g., tens of thousands of seen classes). However, scaling a training dataset of images can be prohibitive, in terms of cost and time. For instance, images need to be annotated to include the additional categories, and objects in the images need to be determined that correspond to the additional categories, requiring significant manual user effort. Moreover, ambiguities in labelling of certain categories exacerbate the difficulty of scaling a training dataset to include additional categories or labels, such as whether to assign a "banana" label to bunches of bananas, or strictly to an individual banana. Consequently, performance of object detectors remains limited by the seen classes of a training dataset used to train the object detector.

SUMMARY

Techniques, systems, and devices are described to detect objects in images with object detectors. Object detectors are trained using heterogeneous training datasets of images, and can detect objects in images of both seen and unseen classes. A first training dataset includes a large-scale image tagging dataset with image-level annotations (e.g., each image includes multiple tags from a larger vocabulary of tags), and is used to train a tagging network of an object detector. Based on an input condition including a word-based concept, the tagging network generates an attention map that indicates presence values for the word-based concept within the input image, such as indicating for each pixel of the input image a respective presence of the word-based concept with a presence value in a specified range. A word embedding of the word-based concept is determined that describes relationships between the word-based concept and different word-based concepts, such as tags from a vocabulary. An attention map generated by a tagging network pre-trained with the first dataset, and a word-embedding generated from a word-based concept are provided to a conditional detection network of the object detector as conditional inputs. The conditional detection network is trained with a second training dataset of images and conditional inputs generated from the pre-trained tagging network. The second training dataset includes images with a small number of seen classes (e.g., hundreds of classes) annotated with corresponding bounding boxes. By conditioning on the attention map and word embedding for a target concept (e.g., the word-based concept), the conditional detection network is image-label agnostic, and functions as a concept-specific object detector. For instance, even though the conditional detection network is trained with a training dataset having a small number of seen classes, it generalizes to novel, unseen classes by concept conditioning, since the word-based concept propagates through the conditional detection network (via the word embedding and attention map) and therefore influences classification and region proposal of the conditional detection network. Accordingly, classes of objects detectable by object detectors are scaled by the techniques, systems, and devices described herein, without the need to scale training databases to include additional classes, thus saving time and money.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
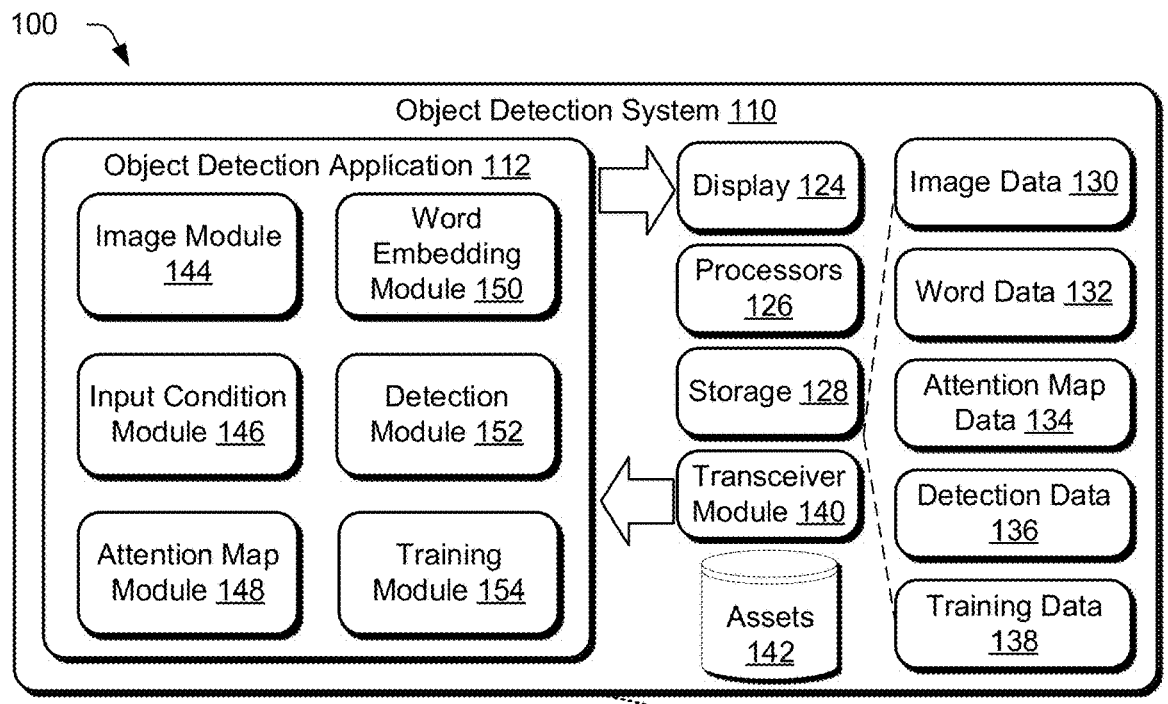
FIG. 1 illustrates a digital medium environment in an example implementation that is operable to employ techniques described herein.
Figure 1:
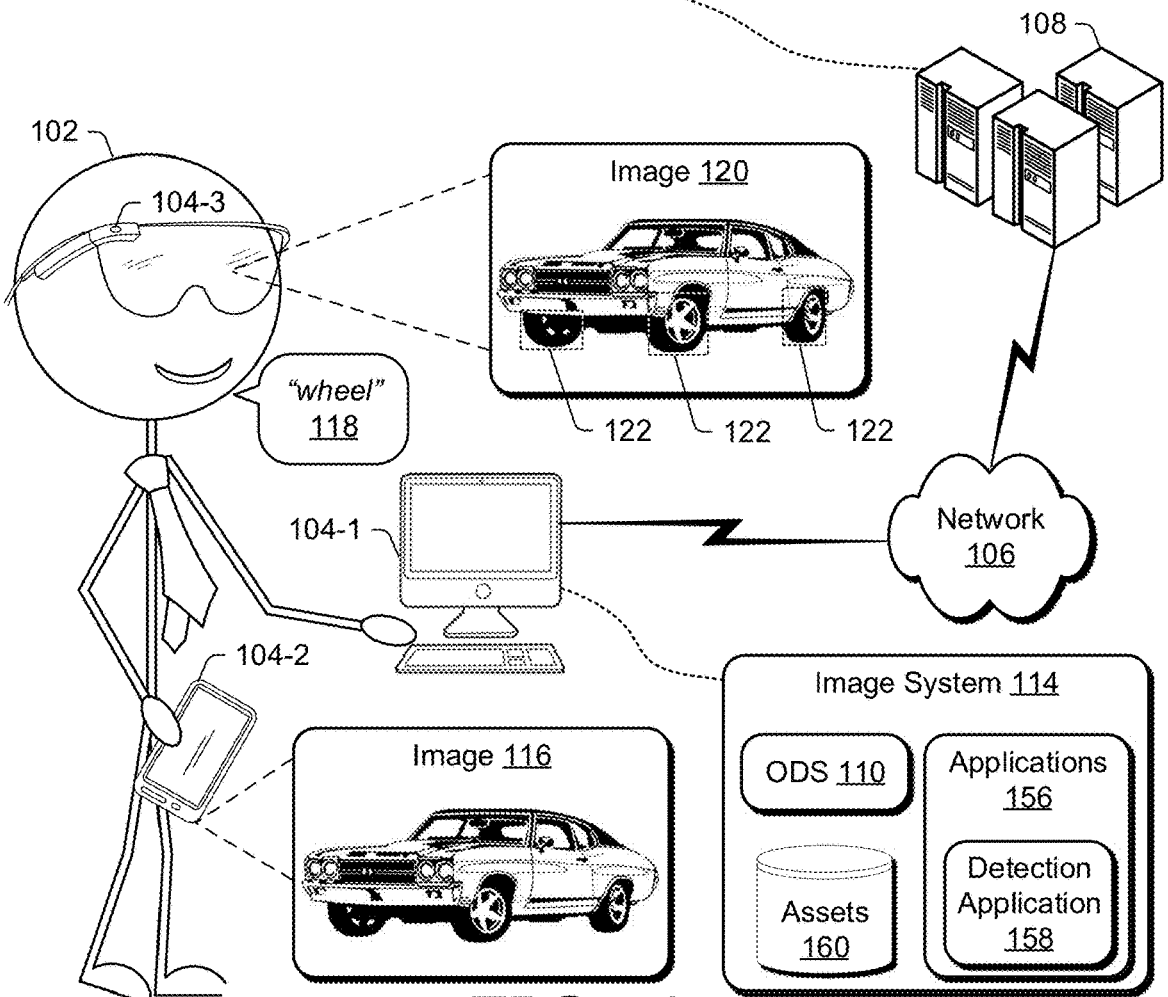

Object detectors detect objects in images, and can be used in a variety of situations that require image processing, such as an image editing application of a user device, a guidance system of a vehicle (e.g., a self-driving car, drone, robot, etc.), image capture systems (e.g., a focus system of a digital camera), color pickers, and the like. Performance of object detectors, however, is usually limited by the object categories of a training dataset used to train the object detector (e.g., seen classes of objects). Hence, an object detector may be able to detect a dog in an image, but be unable to detect a fox in the image, or bias detection results by detecting a fox as a dog, when a training dataset includes a dog class and not a fox class. Furthermore, some object detectors, such as zero-shot detectors, transfer knowledge from seen to unseen classes for classification purposes, but not for object detection and region proposal purposes. Hence, these object detectors often fail to detect regions of images for objects of unseen classes.

To increase detection results for object detectors, a number of seen classes in a training dataset could be scaled (e.g., increased). However, scaling a training dataset of images can be prohibitive, in terms of cost and time, especially for large numbers of classes (e.g., tens of thousands of classes) and ambiguous classes.

Accordingly, this disclosure describes systems, techniques, and devices for detecting objects in images with object detectors for both seen and unseen classes, without requiring scaling of training databases by adding new, additional classes to the training databases. Object detectors are trained using heterogeneous training datasets of images. A first training dataset is used to train a tagging network, and a second training set together with outputs of the pre-trained tagging network are used to train a conditional detection network.

A first training dataset includes a large-scale image tagging dataset with image-level annotations (e.g., each image includes multiple tags of image features from a larger vocabulary of tags), and is used to train a tagging network of an object detector. In one example, a first training dataset is collected from a stock photo web service, such as Adobe Stock. Based on an input condition including a word-based concept, the tagging network generates an attention map specific for the word-based concept. For instance, an attention map may indicate presence values for the word-based concept spatially within the input image, such as indicating for each pixel of the input image a respective presence value of the word-based concept in the range [−1,1].

Based on the input condition including a word-based concept, a word embedding of the word-based concept is generated. A word embedding describes relationships between the word-based concept and different word-based concepts, such as tags from a vocabulary. In one example, a word embedding is generated based on mutual information by constructing a matrix from co-occurrence probabilities of the word-based concept and different word-based concepts or tags, and forming a vector from an Eigen decomposition of the matrix.

An attention map generated by a tagging network pre-trained by the first dataset, and a word-embedding generated from a word-based concept are provided as conditional inputs to a conditional detection network of an object detector. The conditional detection network can include any suitable network to detect an object in an image. In one example, a conditional detection network of an object detector includes a backbone network that accepts conditional inputs and a convolutional neural network that proposes regions of objects in images.

A conditional detection network of an object detector is trained with a second training dataset of images as input images. Conditional inputs for the conditional detection network are generated from a pre-trained tagging network (pre-trained with the first training database). The pre-trained tagging network is also supplied images from the second training dataset, to generate the conditional inputs. The second training dataset includes images with a small number of seen classes (e.g., hundreds of classes) annotated with corresponding bounding boxes. In an example, the second training dataset includes an open, public dataset used for image labeling and classification.

Additionally or alternatively, conditional inputs (e.g., the word embedding and attention map) to the conditional detection network can be zeroed so that the conditional detection network can operate and be trained for conventional multi-class object detection, rather than being conditioned on a word-based concept. For instance, presence values of the attention map can be set to ones and values of the word embedding can be set to zeroes.

In one example, a conditional detection network includes a binary classifier that assigns a positive training label to detection outputs of the conditional detection network that substantially overlap with a ground truth bounding box for the word-based concept. The binary classifier assigns a negative training label to other detection outputs of the conditional detection network that are not assigned a positive training label.

Additionally or alternatively, the conditional detection network can be trained using negative classes with respect to a target class. For instance, a negative class for the word-based concept can be determined, such as by selecting one negative class from a plurality of classes most similar to a target class according to a measure (e.g., a cosine similarity). As an example, for a target class of "dog", negative classes may include "cat", "rabbit", "fox", and "bear". A selected negative class is provided to the conditional detection network, and a negative training label is assigned to detection outputs of the conditional detection network that substantially overlap with a ground truth bounding box corresponding to the target class.

An attention map and a word-embedding are provided as conditional inputs to a conditional detection network so that the word-based concept propagates through the conditional detection network and influences detection results of the conditional detection network. In one example, a word embedding is provided to two layers of a backbone network of a conditional detection network, and an attention map is provided to a third layer of the backbone network of the conditional detection network. The third layer can be between the two layers of the backbone network of the conditional detection network. For instance, layer 1 and layer 3 of stage four of a backbone network can receive a word embedding, and layer 2 of stage four of the backbone network can receive the attention map.

By conditioning on the attention map and word embedding for a target concept (e.g., the word-based concept), the conditional detection network is image-label agnostic, and functions as a concept-specific object detector. For instance, even though the conditional detection network is trained with a training dataset having a small number of seen classes, it generalizes to novel, unseen classes by concept conditioning. Accordingly, classes of objects that can be detected by object detectors are scaled to include unseen classes, without the need to scale training databases to include the unseen classes, thus saving user effort, time, and money.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device. In the example in FIG. 1, user 102 is illustrated as having three computing devices, computing device 104-1, computing device 104-2, and computing device 104-3 (collectively computing devices 104). For instance, computing device 104-1 depicts a desktop computer, computing device 104-2 depicts a smart phone, and computing device 104-3 depicts a pair of eye glasses, such as smart goggles. Computing devices 104 are example computing devices, and any suitable computing device is contemplated, such as a mobile phone, tablet, laptop computer, desktop computer, gaming device, goggles, glasses, camera, digital assistant, wearable device (e.g., watch, armband, adhesive patch, etc.), echo device, image editor, non-linear editor, digital audio workstation, copier, scanner, and the like that may include an application to detect objects in images. Furthermore, discussion of one of computing devices 104 is not limited to that computing device, but generally applies to each of the computing devices 104. Moreover, computing devices 104 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104. For example, computing devices 104 can recognize input as being a mouse input, stylus input, touch input, input provided through a natural user interface, user gestures on a touchscreen, combinations thereof, and the like. Thus, computing devices 104 can recognize multiple types of gestures including touch gestures and gestures provided through a natural user interface. In one example, computing devices 104 include speech recognition, identification, and synthesis functionalities, microphones, and speakers that allow computing devices 104 to communicate with user 102 in a conversation. Moreover, computing devices 104 can include an image capture device (e.g., a camera) configured to capture images and video streams.

Figure 10:
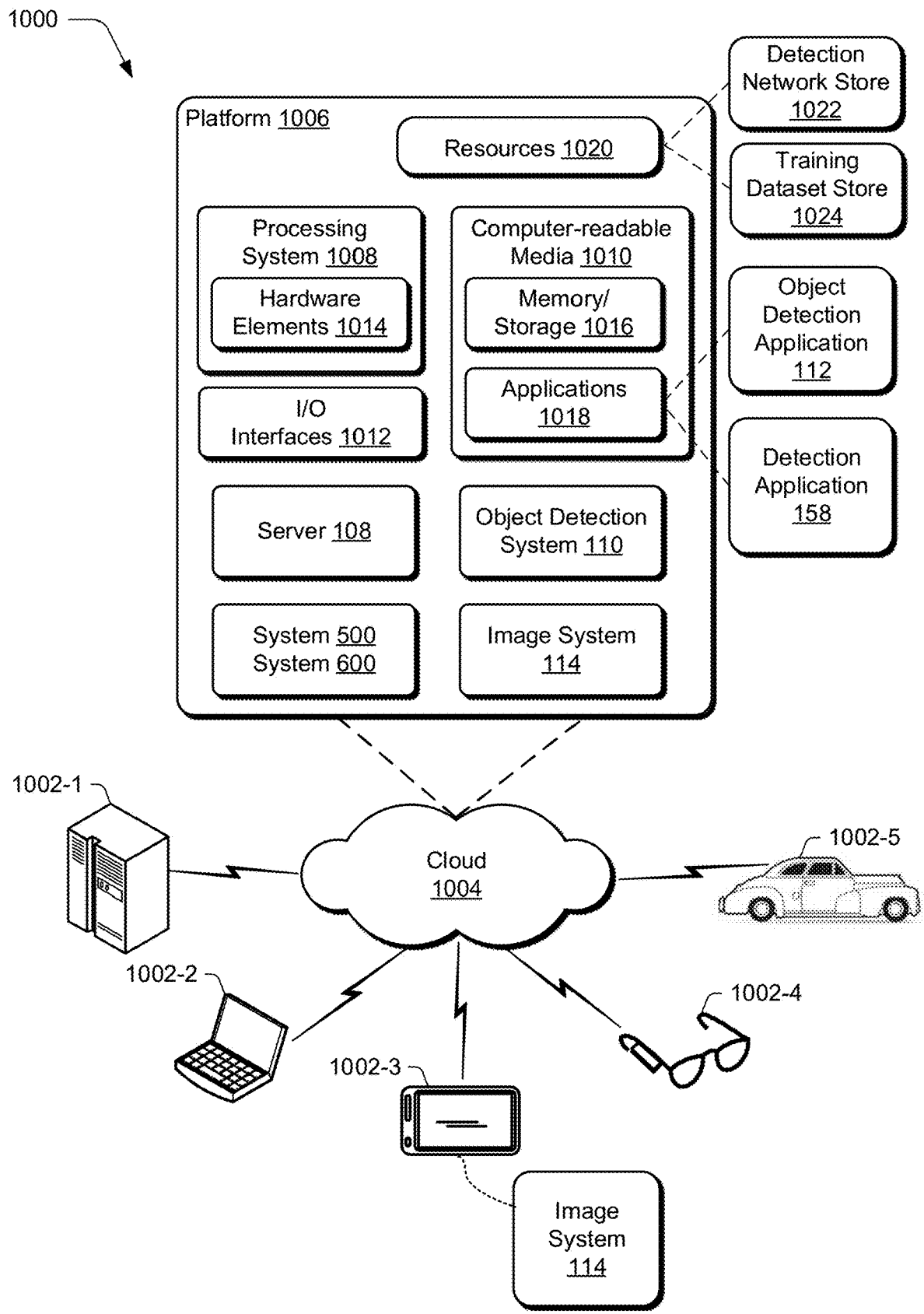
FIG. 10 illustrates an example system including various components of an example device that can be implemented as any type of computing device as described and/or utilized with reference to FIGS. 1-9 to implement aspects of the techniques described herein.

Furthermore, computing devices 104 may be representative of one or a plurality of different devices, such as one or more devices connected to a network that perform operations "over the cloud" as further described in relation to FIG. 10. In one example, computing devices 104 are communicatively coupled to each other, such as with a low power wireless communication standard (e.g., a Bluetooth® protocol). For instance, computing device 104-1 can communicate wirelessly with computing device 104-2. Hence, an image processed on one device (e.g., computing device 104-1) can be communicated to, and displayed on another device (e.g., computing device 104-2).

Computing devices 104 are also coupled to network 106. Network 106 communicatively couples computing devices 104 with server 108. For clarity, only computing device 104-1 is illustrated in FIG. 1 as coupled to network 106, though computing device 104-2 and computing device 104-3 can also be coupled to server 108 via network 106. Network 106 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 108 may include one or more servers or service providers that provide services, resources, or combinations thereof to computing devices 104. In one example, resources provided by server 108 may be licensed, purchased, or may be made freely available, (e.g., without authentication, license, or account-based access). The resources can include any suitable combination of services and content, such as made available over network 106 by one or more providers. Some examples of services include, but are not limited to, an on-line shopping service, a photo editing service, an image database service (e.g., a service providing training images from a database), a web development and management service, a collaboration service, a social networking service, a messaging service, an advertisement service, a graphics design service, an image storage service (including storage and access of photos, documents, records, files, and the like), and so forth. Content may include various combinations of assets, including videos, ads, audio, multi-media streams, animations, images, reference images, web documents, web pages, applications, device applications, text documents, drawings, presentations, stock photographs, user profiles, user preferences, user data (e.g., images stored in an image gallery), and the like.

In the example in FIG. 1, server 108 includes object detection system 110, which includes object detection application 112 (discussed below in more detail), and computing devices 104 include image system 114. Object detection system 110 and image system 114 may work together to detect objects in images. For instance, object detection system 110 may train an adaptive model, such as one or more neural networks of an object detector, to detect objects in images, and provide the trained model via network 106 to image system 114 of computing devices 104. One or more of computing devices 104 may use a pre-trained adaptive model provided by object detection system 110 with image system 114 to detect an object in an image.

For instance, in the example in FIG. 1, user 102 obtains an input image 116 via computing device 104-2. Input image 116 can be any suitable input image, such as a picture, a frame of a video sequence, an animation, a drawing, a cartoon, a map, a document, combinations thereof, and the like. Input image 116 illustrates a car in the example in FIG. 1. User 102 provides an input condition 118, by speaking the word-based concept "wheel". Based on the word-based concept "wheel" of input condition 118, image system 114 generates image 120, which is exposed in a user interface on computing device 104-3. Image 120 includes the image of the car from input image 116, together with detection results 122. Detection results 122 include bounding boxes, illustrated as dashed rectangles, denoting regions of image 120 that include an object corresponding to the word-based concept "wheel". Hence, image system 114, using a pre-trained adaptive model, such as a neural network obtained from object detection system 110 of server 108, detects objects of images conditioned on a word-based concept. The word-based concept need not be part of the training dataset from which the adaptive model was trained (e.g., the word-based concept can be unseen relative to the training dataset).

Object detection system 110 includes display 124. Display 124 can be any suitable type of display, such as a liquid crystal display, plasma display, head-mounted display, projector and screen, a touchscreen that recognizes user gestures (e.g., touch gestures), and the like. A touchscreen of display 124 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Moreover, display 124 can display any suitable interface.

Object detection system 110 also includes processors 126. Processors 126 can include any suitable type and number of processors. Hence, object detection system 110 may be implemented at least partially by executing instructions stored on storage 128 on processors 126. For instance, processors 126 may execute portions of object detection application 112.

Storage 128 can be any suitable type of storage accessible by or contained in object detection system 110. Storage 128 stores and provides access to and from memory included in storage 128 for any suitable type of data. For instance, storage 128 includes image data 130, including data associated with images, such as input images, training images, images of training databases, regions of images corresponding to objects, annotations of images (e.g., annotations including bounding boxes, feature descriptions, and the like), sources of images (e.g., an indicator of a database or image gallery from which an image was obtained, descriptors of capture devices used to capture images, photographer's names who captured images, online stores where images are available, combinations thereof, and the like), metadata of images (e.g., settings of a capture device used to capture an image, such as aperture, shutter speed, focal length, ISO (a measure of light sensitivity of a camera sensor), global positioning system (GPS) coordinates of where an image was captured, a size of an image (e.g., a resolution in number of pixels), a date an image was captured, etc.), a format of an image (e.g., a file format), an image identifier in a sequence of images, such as a video sequence, thumbnail images, combinations thereof, and the like.

Storage 128 also includes word data 132, including data regarding an input condition, such as a word-based concept, word embedding, vocabulary, a recording of a spoken input condition, a translation of an input condition (e.g., into a different language), a transcription of an input condition (e.g., from a recording to a text document), an identification of an algorithm used to generate a word embedding of a word-based concept, parameters of a word embedding, such as a vector length, vocabulary size, etc., an indication of whether a word-based concept is seen or unseen (e.g., whether the word-based concept has a corresponding tag in an image of a training dataset used to train an adaptive model), a language of a word-based concept, parameters of a broadcast function used to reshape a word embedding, combinations thereof, and the like.

Storage 128 also includes attention map data 134, including data regarding an attention map generated by object detection system 110, such as feature maps, spatial responses, presence values, ranges of presence values (e.g., the range [−1,1]), pixel values (e.g., an integer from 0 to 255), weights of an image tagging network, channel numbers of a neural network, cosine similarity scores, combinations thereof, and the like.

Storage 128 also includes detection data 136, including data regarding detection results generated by object detection system 110, such as bounding boxes, region proposals, identifiers of classes, numbers of bounding boxes identified for a target concept, output images, confidence scores of region proposals, outputs of a binary classifier indicating positive or negative labels, user preferences of detection results (e.g., color or line choices selected by users to display bounding boxes), indications of layers or stages of a network configured to receive conditional inputs, indications of whether conditional inputs are used or zeroed, a length of time needed to generate detection results, a difference of current detection results from previous detection results (e.g., a difference of detection results from one frame of a video sequence to another frame of the video sequence), combinations thereof, and the like.

Storage 128 also includes training data 138, including data regarding training of components of object detection system 110, such as a first training database used to train an image tagging network, a second training database used to train a conditional detection network, weights of networks (e.g., an image tagging network, a backbone network, a convolutional neural network, etc.), training losses computed while training a network, sources of training datasets, indicators of images of a training dataset used to train a network, indicators of images of a training dataset skipped when training a network, indicators of ignored, positive, and negative regions detected by an object detector in training, combinations thereof, and the like.

Furthermore, object detection system 110 includes transceiver module 140. Transceiver module 140 is representative of functionality configured to transmit and receive data using any suitable type and number of communication protocols. For instance, data within object detection system 110 may be transmitted to server 108 with transceiver module 140. Furthermore, data can be received from server 108 with transceiver module 140. Transceiver module 140 can also transmit and receive data to and from computing devices 104. In one example, transceiver module 140 includes a low power wireless communication standard (e.g., a Bluetooth® protocol) for communicating data between computing devices.

Object detection system 110 also includes assets 142. In one example, assets 142 are stored in storage 128. Assets 142 can include any suitable asset used or generated by object detection system 110. In one example, assets 142 include adaptive models, such as neural networks, machine learning models, and the like, that have been trained by object detection system 110. Hence, pre-trained models of assets 142 can be provided from server 108 to computing devices 104 via network 106 and used in any suitable application to detect objects in images, such as image 120.

Object detection system 110 also includes object detection application 112. Object detection application 112 includes image module 144, input condition module 146, attention map module 148, word embedding module 150, detection module 152, and training module 154. These modules work in conjunction with each other to generate detection results including detecting objects in images.

Image module 144 is representative of functionality configured to obtain images. Image module 144 can obtain any suitable representation of an image in any suitable way. In one example, image module 144 obtains images from a database of images, such as a database including training datasets of images suitable to train an object detector to detect objects in images. For instance, image module 144 can obtain a first training dataset that includes a large-scale image tagging dataset with image-level annotations (e.g., each image includes multiple tags from a larger vocabulary of tags), and a second training dataset that includes images with a small number of seen classes (e.g., hundreds of classes) annotated with corresponding bounding boxes. In one example, the first training dataset is used to train one or more networks of attention map module 148 (e.g., an image tagging network), and the second training dataset is used to train one or more networks of detection module 152 (e.g., a conditional detection network, such as a backbone network and a convolutional neural network).

Additionally or alternatively, image module 144 can obtain images from image data 130 of storage 128. For instance, image module 144 may obtain an input image that is not a training image, such as an image captured by user 102 with a camera on one of computing devices 104, and object detection system 110 may detect one or more objects in the input image captured by user 102.

In one example, image module 144 obtains an image by receiving a user-supplied image. For instance, user 102 may supply image 116 to object detection system 110. Hence, image module 144 can obtain an image by fetching an image, such as from image data 130, receiving a user-supplied image, or combinations thereof.

An image obtained by image module 144 can be any suitable type of image, such as a stand-alone image (e.g., an image not associated with other images), an image in a sequence of images (e.g., an animation sequence, a video, a page in a chapter of a book, a slide in a slideshow, a training sequence of images, and the like), or combinations thereof. In one example, an image obtained by image module 144 is extracted from an asset that contains other types of media than images, such as a web page containing images and text.

An image obtained by image module 144 may include any suitable metadata, such as annotations indicating tags from a vocabulary that correspond to objects in the image belonging to predetermined classes, coordinates of bounding boxes of objects in the image, tags determined to be similar to target tags, data describing a source of an image, settings of a capture device used to capture an image, a size of an image (e.g., a resolution in number of pixels), a date an image was captured, etc.), a format of an image (e.g., a file format), an image identifier in a sequence of images, such as a video sequence or a training dataset, a thumbnail version of an image, such as can be displayed in a user interface to select and expand the image in the user interface, combinations thereof, and the like.

Images obtained by image module 144, along with any suitable information, such as a source location of an image, a file format of an image, an indication whether the image is related to other images, such as a sequence number in an animation sequence or training dataset, image metadata (e.g., information regarding objects of predetermined classes or categories in an image, such as tags, bounding boxes, etc.), a thumbnail version of an image, and the like, used by or calculated by image module 144 are stored in image data 130 of storage 128 and made available to modules of object detection application 112. In one example, image module 144 obtains an input image, such as a training image of a training dataset suitable to train one or more networks of object detection system 110, and provides the input image to attention map module 148 and detection module 152. Additionally or alternatively, image module 144 may provide an input image to training module 154 so that training module 154 can generate training updates based on the input image, and provide the training updates to detection module 152 to update weights of one or more networks.

Input condition module 146 is representative of functionality configured to obtain an input condition, such as a word-based concept. Input condition module 146 can obtain an input condition in any suitable way. In one example, input condition module 146 obtains an input condition via a user input, such as a spoken command or typed text (e.g., a user can speak into a microphone or type into a keyboard, or both). Additionally or alternatively, input condition module 146 may obtain an input condition from a file, such as a text file. For instance, input condition module 146 may obtain a file containing a list of words, tags, or word-based concepts, and select an entry of the list as an input condition, as part of a training procedure for one or more networks of object detection system 110. In one example, the file is obtained from an image, such as an image in a training database of images.

An input condition obtained by input condition module 146 can represent any suitable category, such as classes describing tangible things (e.g., grass, water, rock, wheel, etc.), classes describing visual attributes (e.g., color, reflectivity, surface texture, shapes, etc.), and classes describing parts of objects (e.g., leg of a person or piece of furniture, lens of a camera, trigger of a gun, handle of a coffee mug, etc.).

Furthermore, input condition module 146 may record any suitable representation of an input condition. In one example, input condition module 146 generates an audio recording of a spoken input condition by sampling an output signal from a microphone, and recording the audio samples in a file. Additionally or alternatively, input condition module 146 may generate a text transcription of an input condition, such as by transcribing a spoken input condition (e.g., user 102 speaks "wheel") to a text file. In one example, input condition module 146 translates an input condition from a first language to a second language. For instance, input condition module 146 may obtain an input condition including a text input in a Chinese language (e.g., written in Han characters), and generate a translated version of the text input into English (e.g., written in Latin characters).

Input conditions obtained by input condition module 146, along with any suitable information, such as a source of an input condition (e.g., a user identification, a file name, an image identifier, etc.), a recording of an input condition (e.g., an audio file), a transcription or translation of an input condition (e.g., a text file), metadata of an input condition (e.g., a language of an input condition, a sampling rate used to record a spoken input condition, an identifier of a training database that includes images having annotations corresponding to an input condition, etc.), and the like, used by or calculated by input condition module 146 are stored in word data 132 of storage 128 and made available to modules of object detection application 112. In one example, input condition module 146 obtains an input condition including a word-based concept, and provides a representation of the word-based concept to attention map module 148 and word embedding module 150.

Attention map module 148 is representative of functionality configured to generate an attention map from an input image for a word-based concept. An attention map generated by attention map module 148, when provided to detection module 152, provides concept-specific hints to a conditional detection network of detection module 152 to better determine objects relevant to the word-based concept. Hence, an attention map generated by attention map module 148 can be any suitable attention map. In one example, an attention map includes pixels indicating presence values for a word-based concept within an input image, the presence values greater than or equal to minus one and less than or equal to one. For instance, each pixel of an attention map can be assigned an integer from 0 to 255 based on a respective presence value in the range of [−1, 1]. Hence, each of the presence values indicated by pixels in an attention map denote a respective presence of the word-based concept at a respective pixel of the input image.

Figure 2:
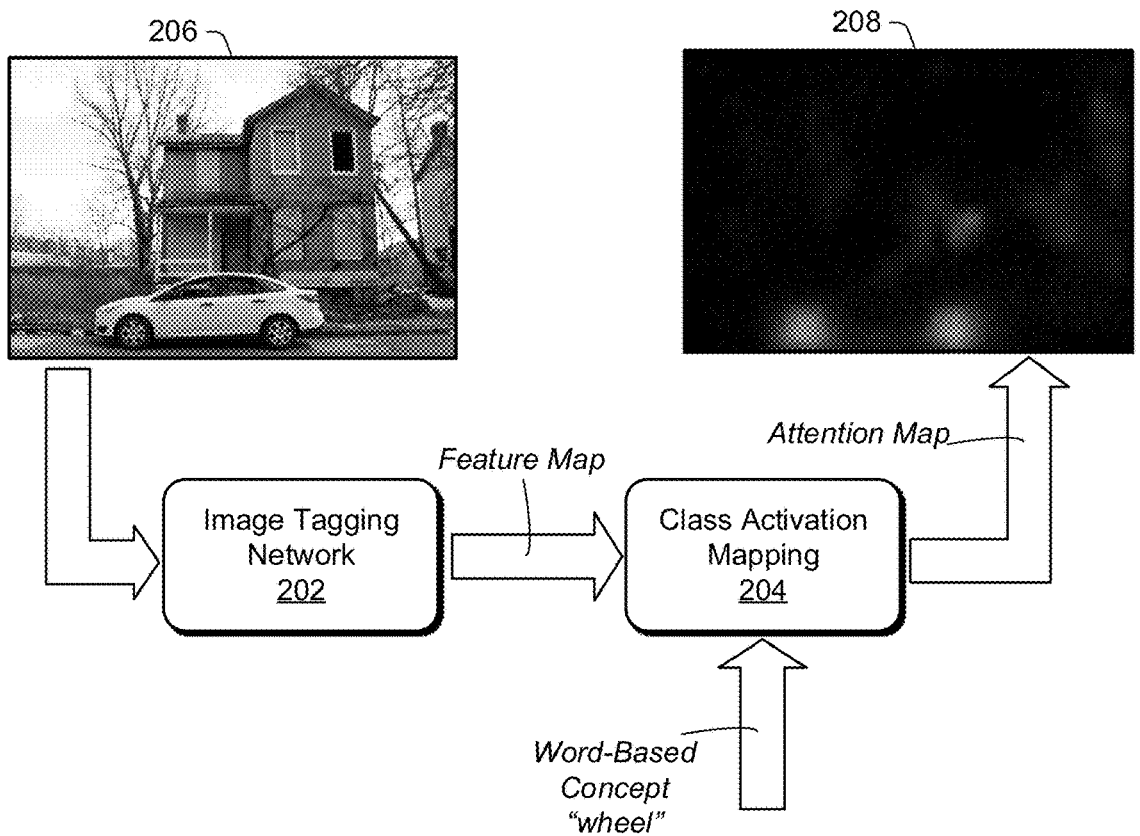
FIG. 2 illustrates generating an example attention map in accordance with one or more aspects of the disclosure.

Attention map module 148 can generate an attention map based on an input image and a word-based concept in any suitable way. For instance, attention map module 148 can include any suitable large scale classifier to extract features from an image and generate an attention map specific to an input condition from the extracted features. In one example, FIG. 2 illustrates generally at 200 generating an example attention map in accordance with one or more aspects of the disclosure. In the example in FIG. 2, image tagging network 202 and class activation mapping 204 are used to generate an attention map based on an input image. Image tagging network 202 and class activation mapping 204 are examples of modules included in attention map module 148 in FIG. 1.

In the example in FIG. 2, input image 206 is provided to image tagging network 202. Image tagging network 202 can include any suitable tagging network to generate any suitable number of feature maps based on input image 206. For instance, image tagging network can generate a three-dimensional (3D) feature map based on input image 206.

In one example, image tagging network 202 includes a tagging network based on ResNet-50 as described in "Deep residual learning for image recognition", *CVPR*, pp. 770-778, 2016, by Kaiming He, Xiangyu Zhang, Shaoqing Ren, and Jian Sun, the disclosure of which is incorporated herein by reference in its entirety. To support image tagging, final fully-connected (FC) classification layer of ResNet-50 can be replaced with three embedding FC layers. Between two embedding FC layers are a batch normalization layer and a ReLU activation layer, as described in "Batch normalization: accelerating deep network training by reducing internal covariance shift", *ICML*, pp. 448-456, by Sergey Ioffe and Chrsitian Szegedy, and "Deep sparse rectifier neural networks", *AISTATS*, pp. 315-323, 2011, by Xavier Glorot, Antoine Bordes, and Yoshua Bengio, respectively, the disclosures of which are incorporated herein by reference in their entirety.

Image tagging network 202 can be trained based on soft topic embedding and minimizing a cosine similarity loss, as discussed below with regards to FIG. 6. Image tagging network 202, once trained, generates a feature map from input image 206, and provides the feature map to class activation mapping 204. Class activation mapping 204 obtains a concept-specific attention map, such as attention map 208 corresponding to the word-based concept "wheel" received by class activation mapping 204, based on a class activation mapping. The global average pool (GAP) layer of ResNet-50 in image tagging network 202 is removed, and the embedding FC layers are made convolutional by converting embedding FC weights to 1×1 covolutional filters. Soft topic word embedding representations for an input image can be converted to 1×1 convolutional filters which are applied to the feature map provided by image tagging network 202 to obtain spatially-preserving responses for each concept (e.g., attention maps). Because a cosine similarity distance measure is used between an image and its soft topic word embeddings, values of an attention map determined by class activation mapping 204 fall within the range [−1, 1].

In the example in FIG. 2, word-based concept "wheel" is provided to class activation mapping 204, which accordingly generates attention map 208. Attention map 208 indicates respective presence values for each pixel of input image 206. For instance, each pixel of output attention map 208 can be assigned an integer from 0 to 255 based on a respective presence value in the range of [−1, 1]. Hence, attention map 208 visually illustrates regions with higher probabilities of including an object corresponding to a "wheel" class as lighter (e.g., white), and regions with lower probabilities of including an object corresponding to a "wheel" class as darker (e.g., black). Accordingly, attention map 208 can provide concept-specific hints to a conditional detection network of detection module 152 to better determine objects relevant to the word-based concept.

Returning to FIG. 1, attention maps generated by attention map module 148, along with any suitable information, such as cosine similarity scores, feature maps, presence values, soft topic word embeddings of images, and the like, used by or calculated by attention map module 148 are stored in attention map data 134 of storage 128 and made available to modules of object detection application 112. In one example, attention map module 148 generates an attention map from an input image for a concept, and provides the attention map to detection module 152 as a conditional input, such as by providing the attention map to a layer of a conditional detection network of detection module 152.

Word embedding module 150 is representative of functionality configured to generate a word embedding based on a word-based concept of an input condition. Word embedding module 150 can generate any suitable word embedding.

A word embedding describes relationships between a word-based concept (e.g., "wheel") and different word-based concepts, such as tags from a vocabulary. In one example, a word embedding generated by word embedding module 150 models relationships between difference concepts. For instance, a word embedding can describe mutual information between a word-based concept obtained by input condition module 146 and tags from a vocabulary, such as a vocabulary stored in word data 132 of storage 128. A word embedding can be generated based on mutual information by constructing a matrix from co-occurrence probabilities of a word-based concept and different word-based concepts or tags, and forming a vector from an Eigen decomposition of the matrix.

In one example, word embeddings are determined from an available text corpus by selecting off-the-shelf word vectors as word embeddings of a word-based concept. Additionally or alternatively, a word embedding can be derived from tag annotations of images. For instance, a first training dataset that is used to train a tagging network of attention map module 148, such as a stock photo web service, (e.g., Adobe Stock) can be used to generate word embeddings from the tags of images in the dataset.

In one example, word embedding module 150 determines a word embedding derived from tag annotations of images based on pointwise mutual information (PMI) between the tags. For instance, a PMI matrix M is generated in which the (i,j)-th element is $$M_{i,j} = \log\frac{p(w_i, w_j)}{p(w_i) \cdot p(w_j)}$$

where $p(w_i, w_j)$ denotes the co-occurrence probability of tag $w_i$ and $w_j$, and $p(w_i)$ and $p(w_j)$ denote the tag frequencies of tags wt and $w_j$, respectively. Accordingly, PMI matrix M is of size V×V, where V denotes a vocabulary size. In one example, V is approximately 18,000.

The PMI matrix M can be decomposed according to any suitable decomposition, such as by rewriting M as $M=USU^T$. In one example, the PMI matrix M is decomposed via an Eigen-decomposition. For instance, matrix U contains Eigenvectors as its columns, and matrix S contains corresponding Eigenvalues on its main diagonal.

Based on a decomposition of PMI matrix M, the matrix $E=U\sqrt{S}$ is constructed. A word embedding is generated from each row of a column-truncated submatrix of E, or $e_i=E_{:,1:K}$ for some integer K. In one example, K is set to 4096, so that each word embedding is denoted by a length-4096 vector. A word embedding for a specific word-based concept can be retrieved by word embedding module 150 from the generated length-K vectors.

Word embeddings determined by word embedding module 150, along with any suitable information, such as, Eigenvalues, Eigenvectors, vocabulary parameters, word vectors, and the like, used by or calculated by word embedding module 150 are stored in word data 132 of storage 128 and made available to modules of object detection application 112. In one example, word embedding module 150 determines a word embedding for a word-based concept, and provides the word embedding to detection module 152 as a conditional input, such as by providing the word embedding to two layers of a conditional detection network of detection module 152.

Detection module 152 is representative of functionality configured to detect objects in images. In one example, detection module 152 receives conditional inputs from object detection system 110, such as an attention map from attention map module 148 and a word embedding from word embedding module 150. Hence, detection module 152 can detect objects in images based on conditional inputs. For instance, detection module 152 can detect at least one region of an input image based on a word embedding and an attention map that includes an object corresponding to a word-based concept used to generate the word embedding and the attention map. Accordingly, detection module 152 can include a conditional detection network. In one example, detection module 152 includes a conditional detection network trained with a second dataset of second images that include annotations with respective bounding boxes of respective objects in the second images.

Figure 3:
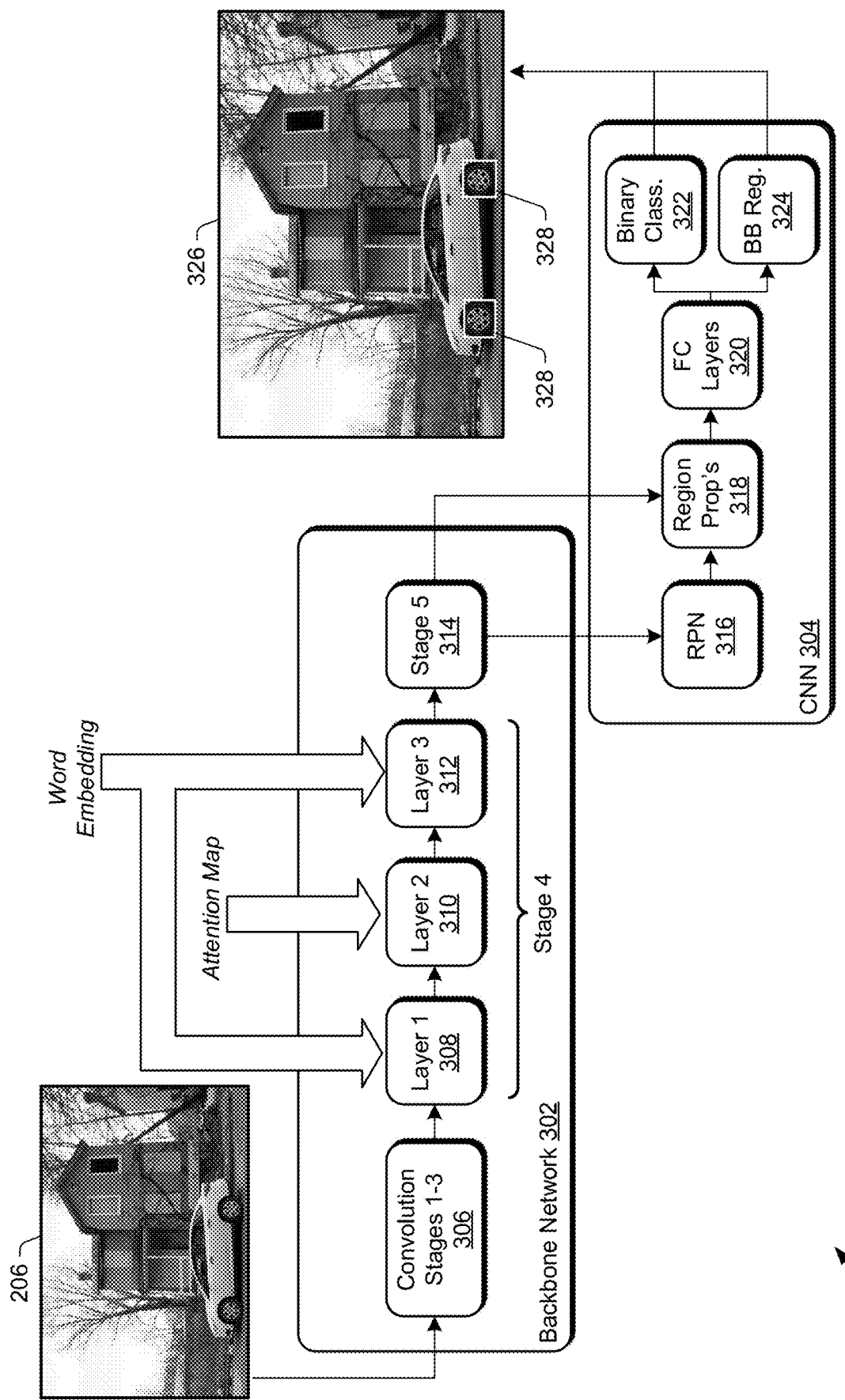
FIG. 3 illustrates an example conditional detection network in accordance with one or more aspects of the disclosure.

Detection module 152 can include any suitable conditional detection network configured to receive conditional inputs, such as an attention map and a word embedding, and detect object in images based on the conditional inputs. One example of a conditional detection network of detection module 152 is illustrated in FIG. 3. FIG. 3 illustrates an example conditional detection network 300 in accordance with one or more aspects of the disclosure.

Conditional detection network 300 includes backbone network 302 and convolutional neural network (CNN) 304. Backbone network 302 can be any suitable backbone network. In the example in FIG. 3, backbone network 302 is based on VGG-16 as described in "Very deep convolutional networks for large-scale image recognition", *ICLR*, 2015, by Karen Simonyan and Andrew Zisserman, the disclosure of which is incorporated herein by reference in its entirety.

Convolutional neural network (CNN) 304 can be any suitable convolutional neural network. In the example in FIG. 3, CNN 304 is based on Faster R-CNN as described in "Faster r-cnn: towards real-time object detection with region proposal networks", *NIPS*, 2015, by S. Ren, K. He, R. Girshick, and J. Sun, and "Faster r-cnn: towards real-time object detection with region proposal networks", *IEEE Transactions on Pattern Analysis and Machine Intelligence*, Vol. 39, No. 6, pp. 1137-1149, 2017, by S. Ren, K. He, R. Girshick, and J. Sun, the disclosures of which are incorporated herein by reference in their entirety.

Conditional detection network 300 receives conditional inputs including an attention map from attention map module 148 and a word embedding from word embedding module 150. These conditional inputs are provided to convolution stage four of backbone network 302, after convolution stages one-three 306. A word embedding is provided as a conditional input to both layer one 308 and layer three 312 of convolution stage four, and an attention map is provided as a conditional input to layer two 310 of convolution stage four. Stage four is selected for insertion of the conditional inputs since it is considerably deep in the hierarchy of VGG-16 making up backbone network 302, so that it can deal with relatively high-level features that are compatible with word embeddings and attention maps (which are semantically high-level). Furthermore, the insertion points at convolution stage four precede convolution stage five 314, which is more appropriate for learning non-linear mappings to combine visual features with the conditional inputs. Moreover, convolution stage four layers of backbone network 302 precede region proposal network (RPN) 316 of CNN 304. Hence, the input conditions inserted into the layers of stage four of backbone network 302 can directly influence RPN 316, region proposals 318, and final classification with FC layers 320 feeding binary classifier 322 and bounding box regression 324 of CNN 304.

A word embedding from word embedding module 150 is provided to layer one 308 and layer three 312 of convolutional layer stage four. In one example, a word embedding is a length-4096 vector, or $e_{inp} \in \mathbb{R}^{4096 \times 1}$. To insert the word embedding as a conditional input, let l be a layer index of layer one 308 or layer three 312 of convolutional layer stage four. The output of the layer is given by $$z_l = \text{ReLU}(W_{conv}^l * z_{l-1} + \text{Broadcast}(W_e e_{inp}) + \beta^l)$$

where * denotes convolution, $z_{l-1}$ denotes a previous layer's output, $\beta^l$ denotes a bias term, and $W_{conv}^l \in \mathbb{R}^{N \times \cdots \times 3 \times 3}$ and $W_e \in \mathbb{R}^{N \times 4096}$ are the weights for conventional convolution and processing the word embedding, respectively. In one example, N is set to 512. Weights $W_e$ map the word embedding vector $e_{inp}$ to an N-dimensional vector. Due to incompatible shapes, $W_e e_{inp}$ is broadcast via a broadcast function before being added to the convolutional features $W_{conv}^l * z_{l-1}$. In one example, the weights are unshared between layer one 308 and layer three 312 of convolutional layer stage four. Since the dimension of the word embedding vector $e_{inp}$ is greater than the dimension N, word embedding vector $e_{inp}$ is provided to both layer one 308 and layer three 312 of convolutional layer stage four, to reduce information loss from the dimensionality reduction caused by the mapping of $W_e$.

An attention map is provided to layer two 310 of stage four of backbone network 302. To incorporate information of the attention map into backbone network 302, the attention map is treated as a mask to convolutional features. Let l be a layer index of layer two 310 of stage four of backbone network 302. The output of layer two 310 is $$z_l = \text{ReLU}(W_{conv}^l * \text{Concat}(z_{l-1}, A_{inp} \odot z_{l-1}) + \beta^l)$$

where $W_{conv}^1 \in \mathbb{R}^{2N \times 4096}$ denotes the convolutional layer weights, Concat(•) denotes a concatenation function that concatenates features along a channel dimension, and $A_{inp} \in \mathbb{R}^{1 \times H \times W}$ is an attention map for a target concept. The attention map is upsampled to match the spatial size (H×W) of z via a bilinear interpolation. The operator $\odot$ denotes elementwise multiplication. The masked features $(A_{inp} \odot z_{l-1})$ provide rough knowledge of regions corresponding to a target concept. The unmasked features $(z_{l-1})$, however, allow information at all locations to be considered, and therefore may be helpful to preserve information in the event the attention map is not accurate or reliable.

By inserting the input conditions inserted into the layers of stage four of backbone network 302 as illustrated in FIG. 3 and describes above, the attention map and word embedding can directly influence region proposals and classifications of CNN 304. In the example in FIG. 3, an attention map for input image 206 is provided together with a word embedding of the word-based concept "wheel". In response, conditional detection network 300 generates output image 326. Output image 326 includes detection results 328, illustrating bounding boxes over the wheels of the car in the image. Hence, conditional detection network 300 has correctly detected objects in input image 206 corresponding to the input condition "wheel".

Due to the power of conditional detection network's 300 generalization to images unseen during training and the class-agnostic nature of the network, conditional detection network 300, when trained using only a second training dataset of images with a small number of classes (e.g., hundreds of classes), can scale and generalize to word embeddings and attention maps of unseen concepts.

Returning again to FIG. 1, objects detected by detection module 152, along with any suitable information, such as detection results, bounding boxes, positive and negative labels, numbers of objects matching a target concept, and the like, used by or calculated by detection module 152 are stored in detection data 136 of storage 128 and made available to modules of object detection application 112. In one example, detection module 152 exposes detection results in a user interface of a display, such as display 124. Additionally or alternatively, detection module 152 can provide detection results to training module 154, which can use the detection results to generate training updates used to update weights of a network of detection module 152.

Training module 154 is representative of functionality configured to train one or more networks of object detection system 110. Training module 154 can train any suitable network in any suitable way. In one example, training module 154 trains an image tagging network of attention map module 148, such as image tagging network 202 in FIG. 2, and a conditional detection network of detection module 152, such as conditional detection network 300 in FIG. 3. Training module 154 can train an image tagging network of attention map module 148 and a conditional detection network of detection module 152 with different, heterogeneous training datasets.

In one example, training module 154 trains an image tagging network of attention map module 148 using a first dataset of first images that include annotations without bounding boxes of objects in the first images, and trains a conditional detection of detection module 152 using a second dataset of second images that include respective bounding boxes of respective objects in the second images. Conditional inputs (e.g., a word embedding and an attention map) for the conditional detection of detection module 152 can be obtained from an image tagging network of attention map module 148 that has been pre-trained with the first dataset of images.

The first dataset may include a stock-18 dataset including six million or more images with image-level annotations. Each image in the first dataset can be labeled with a number of tags (e.g., 10-20 tags) from a vocabulary of 18,000 classes. In one example, a stock-18 dataset is obtained from a stock photo web service. The second dataset, however, may include images from an open image dataset, such as a publicly available dataset, e.g., open images (v3) as described in "Openimages: a public dataset for large-scale multi-label and multi-class image classification", available online, 2017, by I. Krasin et al., the disclosure of which is incorporated herein by reference in its entirety. In one example, the second dataset includes fewer images than the first dataset, such as approximately 1.5 million (compared to six million). Additionally or alternatively, images of the second dataset may include annotations (e.g., bounding boxes) for concepts from a vocabulary containing 545 trainable classes. In one example, of the 545 trainable classes, only those classes which intersect with classes of the first dataset are maintained in the second dataset. For instance, of the 545 trainable classes in open images (v3), only 448 classes may be kept in the second dataset used to train a conditional detection network of detection module 152. Additionally or alternatively, the second dataset may be constructed by selecting some, but not all, of images from an open image dataset, such as selecting 295 thousand images from 1.5 million images of open images (v3).

Training module 154 can train any suitable network according to any suitable loss function. To keep a conditional detection network label agnostic, a binary loss can be used. For instance, in conditional detection network 300 of FIG. 3, CNN 304 includes binary classifier 322. In binary classifier 322, a binary sigmoid cross-entropy loss is used, rather than a softmax cross-entropy loss of Faster R-CNN. A binary classifier, such as binary classifier 322, can assign a positive label (e.g., a positive training label) to detection outputs of the conditional detection network that substantially overlap with a ground truth bounding box that corresponds to a given word-based concept, and a negative label (e.g., a negative training label) to other detection outputs that are not assigned a positive label. Additionally or alternatively, a binary classifier can be used to train a conditional detection network for negative classes of inputs. For instance, a negative class for a word-based concept can be provided to a conditional detection network, and a negative label can be assigned by a binary classifier to detection outputs that substantially overlap with a ground truth bounding box corresponding to the word-based concept. Training with positive and negative training labels, and with negative classes of inputs is illustrated in FIG. 4.

Figure 4:
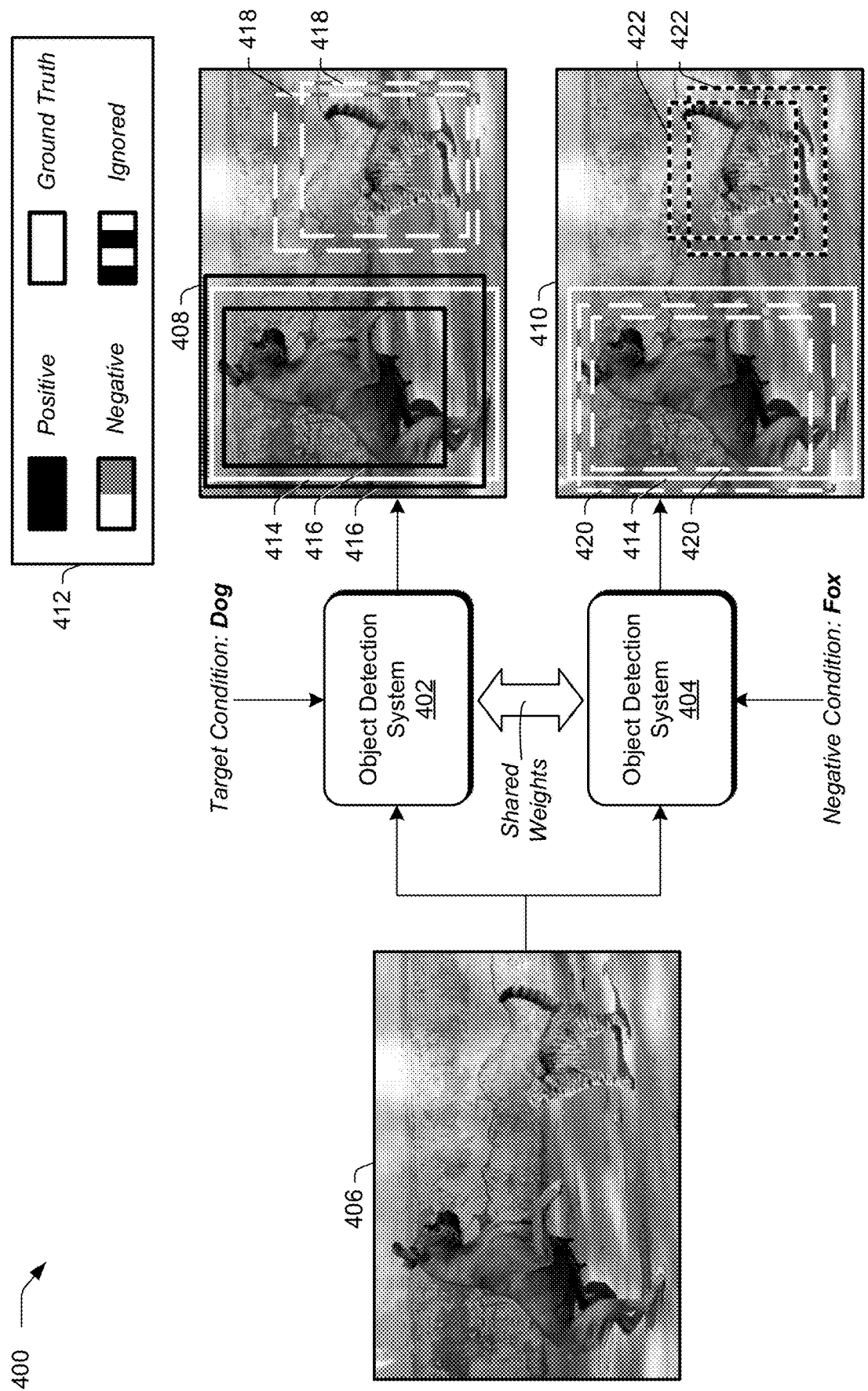
FIG. 4 illustrates example training of an object detection system in accordance with one or more aspects of the disclosure.

FIG. 4 illustrates generally at 400 example training of an object detection system in accordance with one or more aspects of the disclosure. In FIG. 4, object detection system 402 and object detection system 404 are trained with input image 406. Object detection system 402 and object detection system 404 are examples of object detectors included in detection module 152, such as conditional detection network 300 in FIG. 3.

In FIG. 4, object detection system 402 and object detection system 404 are provided respective input conditions together with input image 406. For instance, object detection system 402 is provided a target condition "dog". In one example, a target condition is selected by randomly selecting one of a plurality of classes identified by tags included in input image 406.

Object detection system 404 is provided a negative condition, e.g., a negative class, with respect to the target condition provided to object detection system 402. A negative class is a class that may provide a similar word embedding and a similar attention map as a target class, despite being semantically disjoint from the target condition. For instance, "dog" and "bear" are examples of classes that may have similar word embeddings and attention maps as each other, but are semantically disjoint.

A negative class relative to a target class can be determined in any suitable way. In one example, training module 154 identifies a plurality of negative classes most similar to a target class from classes of a training dataset, according to a cosine similarity measure of respective word embeddings of classes. Additionally or alternatively, a negative class may be constrained so that it is not a hyponym or a hypernym of a target class. Training module 154 may randomly select one of the plurality of negative classes (e.g., one of ten identified negative classes) and provides the selected negative class to object detection system 404. For instance, object detection system 404 is provided a negative condition "fox", relative to the target condition "dog".

During training, object detection system 402 and object detection system 404 can share weights. Object detection system 402 generates output image 408, and object detection system 404 generates output image 410, based on input image 406 and respective input conditions. Output image 408 and output image 410 include detection results denoted by bounding boxes, and the bounding boxes are classified by a binary classifier as indicated by their line type according to key 412. For instance, key 412 indicates that white corresponds to ground truth, black corresponds to a positive training label, long-dashed grey and white corresponds to a negative training label, and short-dashed black and white corresponds to an ignored detection result.

In output image 408 and output image 410, bounding box 414 is a ground truth bounding box. For instance, bounding box 414 is included with input image 406, such as in a tag corresponding to class "dog". In output image 408 produced by object detection system 402 conditioned on the target condition "dog", bounding boxes 416 are assigned positive training labels, since they substantially overlap with ground truth bounding box 414. Overlap can be determined in any suitable way, such as based on an amount of overlapping area, a ratio of overlapping area to non-overlapping area of a detection result, a center of mass being overlapped, combinations thereof, and the like. Bounding boxes 418 of output image 408, however, are assigned a negative training label, since they do not substantially overlap with ground truth bounding box 414. Rather, they correspond to the cat in the image, not the dog.

In output image 410 produced by object detection system 404 conditioned on the negative condition "fox", bounding boxes 420 are assigned negative training labels, since they substantially overlap with ground truth bounding box 414. Hence, object detection system 404 is trained to distinguish between a dog and a fox. Bounding boxes 422 in output image 410 are ignored.

In one example, for each detection result of object detection system 404 conditioned on a negative condition that substantially overlaps with a ground truth bounding box (e.g., bounding boxes 420 overlapping with ground truth bounding box 414 in output image 410), training module 154 computes two scores. A first score, $s^c$, uses features conditioned on a target condition, and a second score, $s^n$, uses features conditioned on a negative condition with respect to the target condition. Training module 154 can train an object detector by minimizing a loss determined from the two scores, such as a margin ranking loss $L_{neg}$=max $(0,s^n-s^c+\gamma)$ to encourage $s^c$ to be larger than $s^n$ with a margin according to parameter $\gamma$.

Returning again to FIG. 1, training module 154 can also be configured for conventional training of a network for multi-class learning without conditional inputs. For instance, training module 154 may be configured to zero a word embedding and an attention map provided as conditional inputs to a conditional detection network being trained by training module 154. To zero the conditional inputs, training module 154 may set presence values of an attention map to ones, and values of a word embedding to zeroes. When the conditional inputs are zeroed, the conditional detection network can detect multiple objects of different classes (e.g., word-based concepts) in a vocabulary. When conditional inputs are zeroed for multi-class learning, a conditional detection network can be trained with a loss $\lambda \cdot L_{conditional}+(1-\lambda) \cdot L_{multi-class}$ where $L_{conditional}$ and $L_{multi-class}$ are conditional (e.g., conditional inputs are not zeroed) and multi-class (e.g., conditional inputs are zeroed) detection losses, respectively.

Training data of training module 154, along with any suitable information, such as detection results, bounding boxes, positive and negative training labels, numbers of objects matching a target concept, scores, training losses, training datasets (e.g., heterogeneous datasets used to train networks of attention map module 148 and detection module 152), and the like, used by or calculated by training module 154 are stored in training data 138 of storage 128 and made available to modules of object detection application 112. In one example, training module 154 generates training updates for a conditional detection network of detection module 152, such as updates to weights of a neural network, to train the conditional detection network. Additionally or alternatively, training module 154 can generate training updates for an image tagging network of attention map module 148, such as updates to weights of a neural network, to train the image tagging network.

In the example in FIG. 1, object detection system 110 trains an object detector, such as an object detector including object detection application 112, and provides the trained object detector to computing devices 104 for use in a client application. Hence, each of computing devices 104 includes image system 114. Image system 114 includes applications 156, which can include any suitable application, such as an application configured to be executed by one or more of computing devices 104. Applications 156 includes detection application 158. Detection application 158 can be any application configured to detect an object in an image, such as an image editing application, a vehicular application (e.g., a guidance system in a self-driving car, an in-vehicle control system for lighting or entertainment, a noise cancellation system, etc.), a control system of a robot or drone, an image cataloging application, and the like.

Image system 114 also includes assets 160. Assets 160 can include any suitable asset used by image system 114, such as object detectors provided by server 108, training databases, word embeddings, vocabularies, combinations thereof, and the like. Image system 114 also includes a copy of object detection system 110 of server 108. Hence, though in the example of FIG. 1 object detection system 110 of server 108 is described as training an object detector and providing it to one of computing devices 104, computing devices 104 can additionally or alternatively train an object detector. An object detector trained by image system 114 (e.g., using a copy of object detection system 110), can be stored in assets 160 and made available to any suitable application, such as detection application 158.

Having considered an example digital medium environment, consider now a discussion of example systems in accordance with one or more aspects of the disclosure.

Example Object Detection Systems

Figure 5:
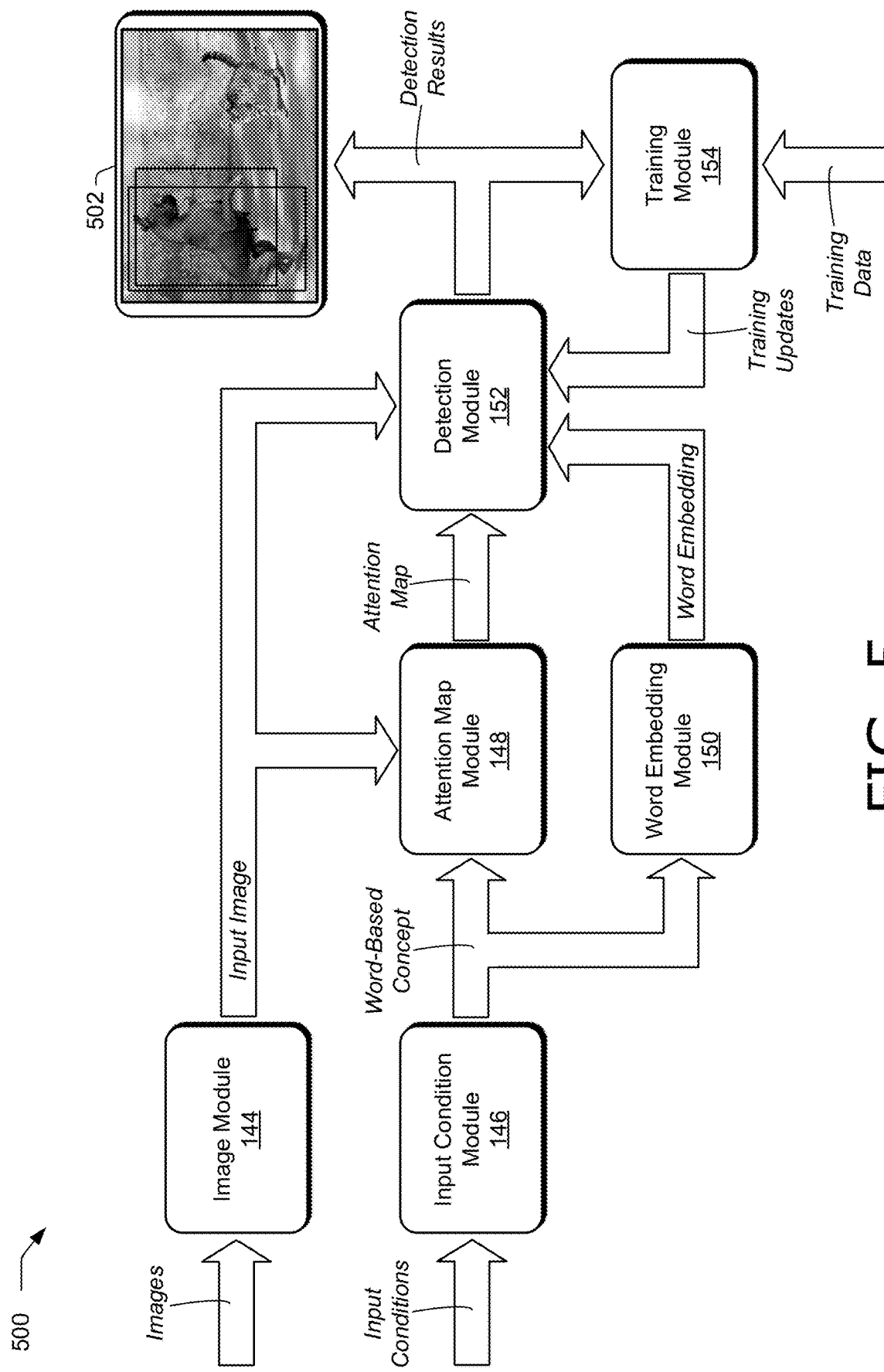
FIG. 5 illustrates an example system in accordance with one or more aspects of the disclosure.

FIG. 5 illustrates an example system 500 in accordance with one or more aspects of the disclosure. In this implementation, system 500 includes the modules of object detection application 112 as described in FIG. 1, e.g., image module 144, input condition module 146, attention map module 148, word embedding module 150, detection module 152, and training module 154. System 500 is one example of object detection system 110 that can be constructed using the modules of object detection application 112. For instance, signals can be redefined, and modules can be modified, combined, divided, added, or removed to form a modified system, without altering the functionality of system 500. Accordingly, such modified systems are considered to be within the scope of the disclosure.

Furthermore, for simplicity system 500 is limited to the modules of object detection application 112 and a description of some of their interconnects. System 500 can, however, include any suitable signals and communications between modules omitted for simplicity. Such signals may include system clocks, counters, image indicators, map indicators, image identification numbers, reset signals, and the like. In one example, system 500 can operate in real time (e.g., with no perceptible delay to a user) to generate an output image such as output image 502 that includes detection results (e.g., bounding boxes). Accordingly, signals can be calculated by the modules of system 500 and communicated between the modules of system 500 without significant delay. In one example, system 500 trains a network, such as a neural network of detection module 152. Additionally or alternatively, system 500 can generate an output image with detection results for a user-provided input image, such as an image that is not part of a training dataset used to train a network of system 500.

Moreover, system 500 can be implemented on any suitable device or devices. In one example, system 500 is implemented on one computing device (e.g., server 108 or one of computing devices 104 in FIG. 1). In another example, system 500 is implemented on more than one computing device. For instance, parts of system 500 can be implemented by a first computing device, such as computing device 104-1 or server 108 in FIG. 1, and other parts of system 500 can be implemented by an additional computing device or devices, such as computing device 104-2. In one example, a server implements parts of system 500, such as server 108 in FIG. 1. A server can be remote, e.g., because it is not collocated with the first computing device. A server may be configured to receive signals of system 500 from a computing device (e.g., one or more of computing devices 104), process the received signals, such as with object detection system 110, and transmit results of the processing back to the computing device. Hence, object detection system 110 of server 108 in FIG. 1 may include system 500. In one example, system 500 is used to train an adaptive model (e.g., neural network, machine learning model, and the like) of an object detector by a first computing device, such as by server 108, and the trained adaptive model is supplied by the first computing device to a different computing device, such as one of computing devices 104.

Additionally or alternatively, parts of system 500 can be implemented by an additional computing device that is collocated with a first computing device. For instance, one of computing devices 104 may be a first computing device, and another of computing devices 104 may be an additional, collocated computing device. The first computing device and the additional computing device may be operated by one or more users. Hence, system 500 provides for multiple users within an environment to share data included in system 500. For instance, a training database may be obtained by a first computing device operated by a first user who selects digital images to train an object detector, and the selected images may be provided to a second computing device operated by a second user. The second user may use the selected images from the first user to train an object detector on the second computing device, and provide the trained object detector back to the first user on the first computing device. The first user may then use the trained object detector to detect objects in images and share the detection results with other users, such as the second user on the second computing device.

Image module 144 obtains one or more images. Image module 144 can obtain any suitable type of image in any suitable way. In one example, image module 144 obtains images from a database of images, such as a database of training datasets that can be used to train an adaptive model (e.g., a neural network) of an object detector. Additionally or alternatively, image module 144 may obtain a user-supplied image, such as an image from a user provided as input to an image editing application. In one example, image module 144 captures images to be processed by system 500, such as by capturing images as a vehicle moves and detecting objects in the images in real time to control a guidance system of the vehicle.

In one example, image module 144 obtains images from a first training dataset, such as a first dataset of first images that include annotations without bounding boxes of objects in the first images. The first training dataset can be used to train a tagging network of attention map module 148. Additionally or alternatively, image module 144 can obtain images from a second dataset of second images that include annotations with respective bounding boxes of respective objects in the second images. The second training dataset can be used to train a conditional detection network of detection module 152.

Image module 144 provides one or more images as input images to attention map module 148 and detection module 152.

Input condition module 146 obtains one or more input conditions, such as an input condition including a word-based concept. Input condition module 146 can obtain any suitable input condition in any suitable way, such as an input condition including a word-based concept that describes a class or category for objects to be detected in an image. A word-based concept can describe any suitable class, such as a class describing tangible things (e.g., grass, water, rock, wheel, etc.), a class describing visual attributes (e.g., color, reflectivity, surface texture, shapes, etc.), a class describing parts of objects (e.g., leg of a person or piece of furniture, lens of a camera, gear of a machine, handle of a coffee mug, etc.), and the like.

Input condition module 146 can obtain an input condition in any suitable way, such as from a user-spoken utterance (e.g., a user may speak "wheel" into a microphone), text (e.g., a user may type an input condition, an input condition may be read from a text file, an input condition may be extracted from metadata of an image, such as annotations describing objects in an image, etc.), combinations thereof, and the like.

Additionally or alternatively, input condition module 146 can process an input condition in any suitable way, such as translating an input condition from one language to another language, transcribing an input condition (e.g., generating a text file containing a transcription of a spoken utterance), correct typos in an input condition (e.g., correct spelling or grammar mistakes, etc.), combinations thereof, and the like.

Input condition module 146 provides a word-based concept from an input condition to attention map module 148 and word embedding module 150.

Attention map module 148 receives an input image from image module 144 and a word-based concept from input condition module 146, and generates an attention map. Attention map 208 in FIG. 2 is an example of an attention map generated by attention map module 148 corresponding to the word-based concept "wheel" for input image 206. Attention map module 148 can generate an attention map in any suitable way. In one example, attention map module 148 in system 500 includes an image tagging network that has been pre-trained with training module 154, as discussed below with regards to FIG. 6.

Attention map module 148 can generate any suitable attention map. In one example, attention map module 148 generates an attention map that indicates presence values for a word-based concept within an input image. For instance, an attention map can indicate, for each pixel of the input image, a respective presence of the word-based concept with a presence value in a range, such as less than or equal to one and greater than or equal to negative one, e.g., [−1, 1].

An attention map generated by attention map module 148 can provide concept-specific hints to better detect objects in an image. Accordingly, attention map module 148 provides an attention map generated for an input image according to a word-based concept to detection module 152.

Word embedding module 150 receives a word-based concept from input condition module 146 and generates a word embedding for the word-based concept. A word embedding generated by word embedding module 150 describes relationships between the word-based concept and different word-based concepts, tags, or words.

Word embedding module 150 can generate a word embedding in any suitable way. In one example, word embedding module 150 generates a matrix from co-occurrence probabilities of a word-based concept and different word-based concepts, tags, or words, and performs an Eigen decomposition of the matrix. A word embedding for a given concept is obtained from a row corresponding to the given concept of the decomposition, such as by taking values of the first 4096 columns at a row of a matrix formed from the decomposition as a vector representing the word embedding for the given concept.

A word embedding of a word-based concept generated by word embedding module 150 extends the coverage of the word-based concept beyond a single tag or word of a vocabulary. Accordingly, word embedding module 150 provides a word embedding to detection module 152.

Detection module 152 receives an input image from image module 144, an attention map from attention map module 148, and a word embedding from word embedding module 150, and generates detection results, such as detection results illustrated in output image 502. In one example, detection results generated by detection module 152 include at least one region of an input image based on a word embedding and an attention map that includes a respective object corresponding to the word-based concept. For instance, detection module 152 may generate an output image with detection results including bounding boxes that surround a dog in the input image when the word embedding corresponds to the word-based concept "dog", as illustrated in output image 502 in FIG. 5.

Detection module 152 can generate detection results in any suitable way. In one example, detection module 152 includes a conditional detection network, such as conditional detection network 300 in FIG. 3.

In the example in FIG. 5, detection module 152 provides detection results to training module 154. Training module 154 also receives training data, such as training images of a training database of images that include annotations illustrating ground truth bounding boxes of objects in an image. An input image obtained by image module 144 may be an example of training data received by training module 154. Based on comparing detection results generated by detection module 152 with training data, training module 154 generates training updates. Training module 154 can generate any suitable training update in any suitable way, such as weights of neural networks used in convolutions, updated by stochastic gradient descent that minimizes any suitable loss function. Training module 154 provides training updates to detection module 152, which updates parameters of an object detector according to the training updates to train detection module 152. System 500 can process any suitable number of training images to train an object detector of detection module 152.

Figure 6:
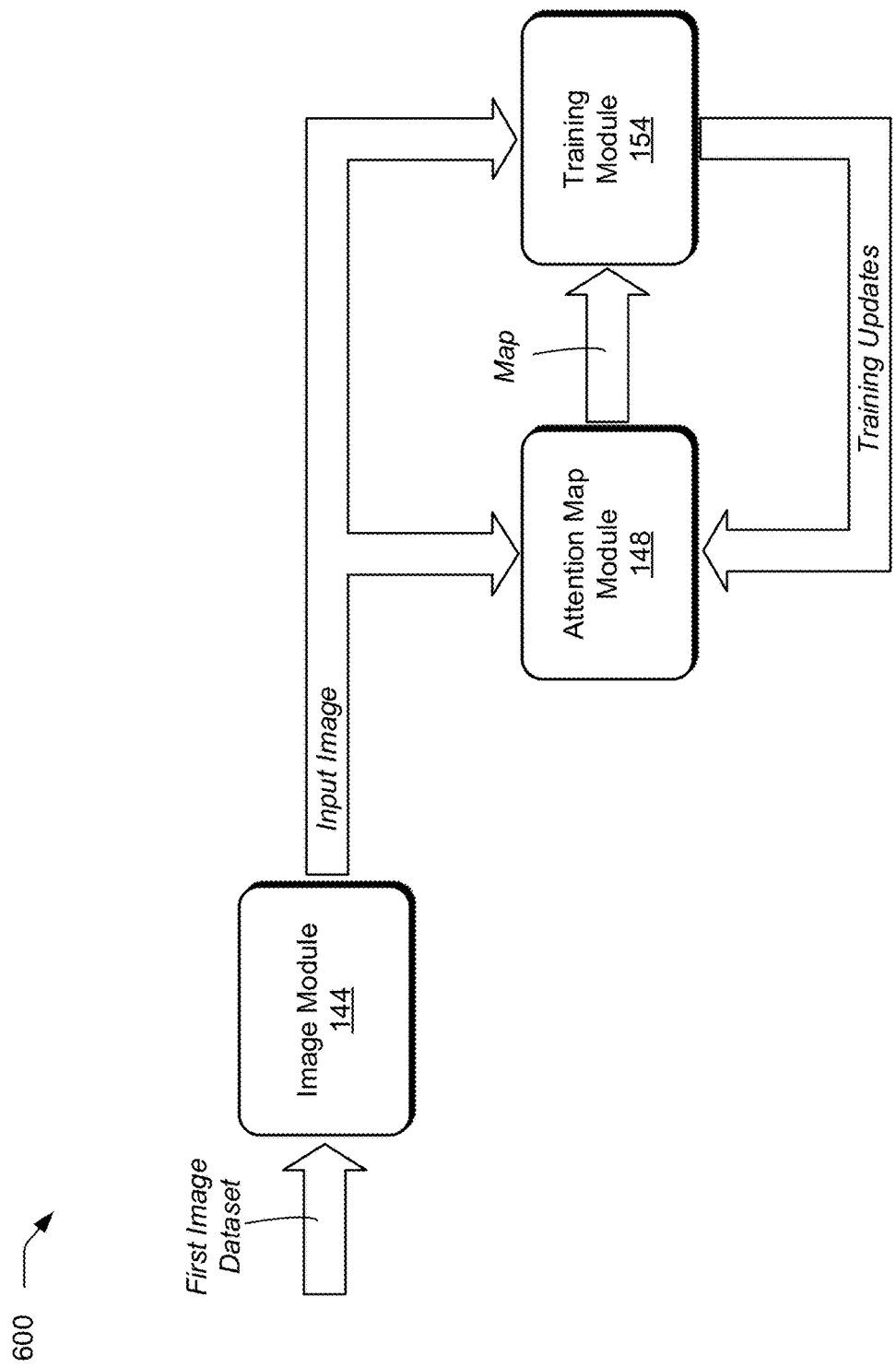
FIG. 6 illustrates an example system in accordance with one or more aspects of the disclosure.

In one example, attention map module 148 of system 500 includes one or more adaptive models (e.g., an image tagging network) that is pretrained using training module 154, which is illustrated in system 600 of FIG. 6.

FIG. 6 illustrates an example system 600 in accordance with one or more aspects of the disclosure. In the example in FIG. 6, attention map module is trained with images of a first training dataset. Image module 144 obtains images from a first training dataset, such as images that do not include bounding box annotations of objects in the images. A first training dataset of images used to train attention map module 148 can be heterogeneous with respect to a second training dataset used to train detection module 152 as discussed above.

Input images from a first training dataset are provided by image module 144 to attention map module 148 and training module 154. Attention map module generates any suitable map from a received input image in any suitable way, such as a feature map of the input image, an attention map generated from a feature map for a given concept, combinations thereof, and the like. Image tagging network 202 and class activation mapping 204 in FIG. 2 are examples of modules of attention map module 148 that can generate a feature map and an attention map, respectively used to train attention map module 148 in system 600 of FIG. 6. A map according to an input image generated by attention map module 148 is provided to training module 154.

Training module 154 also receives training data, including an input image obtained by image module 144. Based on comparing parameters of a map generated by attention map module 148 with parameters of an input image, such as by comparing features identified in annotations of an input image with tags generated by attention map module 148 in a feature map, training module 154 generates training updates. Training module 154 can generate any suitable training update in any suitable way, such as weights of neural networks used in convolutions, updated by stochastic gradient descent that minimizes any suitable loss function. Training module 154 provides training updates to attention map module 148, which updates parameters of image tagging network according to the training updates to train attention map module 148. System 600 can process any suitable number of training images to train an image tagging network of attention map module 148.

Training module 154 can generate a training update in any suitable way. In one example, training module 154 generates training updates to minimize a cosine similarity loss between a visual embedding (e.g., a feature map) output by attention map module 148 and a soft topic embedding of an input image. For instance, a soft topic embedding of an input image can be constructed by aggregating word representations of ground truth tags included in the image. A weighted average over all tags can be computed according to $t=\Sigma_i \alpha_i \cdot e_i$, where $\alpha_i = -\log(p(w_i))$ is the inverse document frequency of word $w_i$. A cosine similarity loss can be constructed according to $$1 - \frac{v^T \cdot t}{\|v\| \cdot \|t\|},$$

where v denotes any suitable visual embedding output by attention map module 148, such as a feature map.

The systems described herein constitute an improvement over systems that are trained without heterogeneous datasets and are limited to detecting objects of seen classes (e.g., defined classes existing in images of a training database). Rather, the systems described herein include object detectors with image tagging networks and conditional detection networks that are trained using heterogeneous datasets with respect to one another, and can detect objects in images of both seen and unseen classes. An attention map and a word embedding for a target concept are provided as conditional inputs to the conditional detection network, so that the conditional detection network is image-label agnostic and concept-specific. Accordingly, despite the conditional detection network being trained with a training dataset having a small number of seen classes, it generalizes to novel, unseen classes by concept conditioning, since the word-based concept propagates through the conditional detection network via the conditional inputs and influences classification and region proposal. Hence, classes of objects that can be detected by object detectors are expanded by the systems described herein, without the need to scale training databases to include additional classes, thus saving time and money.

Having considered example systems, consider now a discussion of example procedures for object detection in images in accordance with one or more aspects of the disclosure.

Example Procedures

Figure 7:
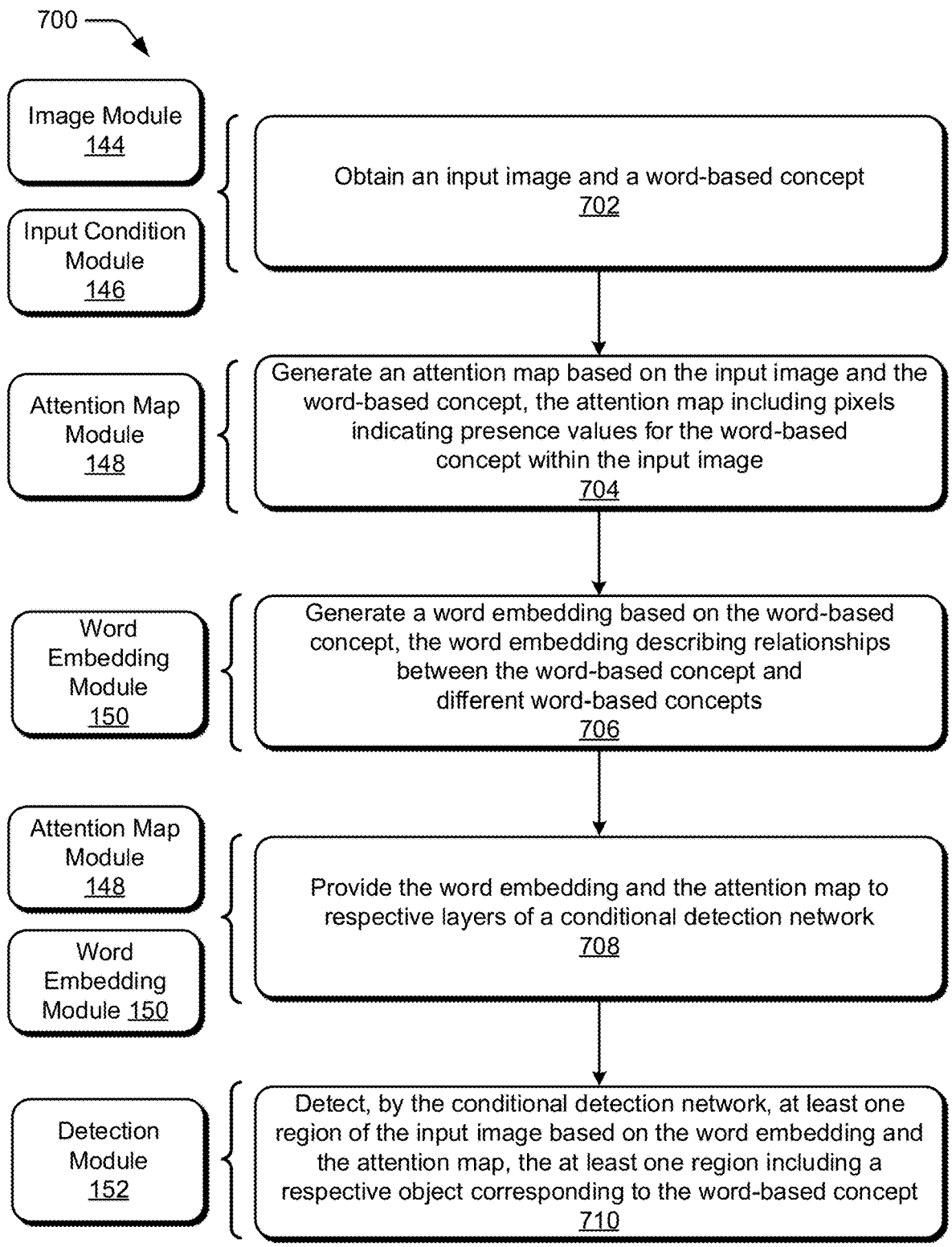
FIG. 7 illustrates a flow diagram depicting an example procedure in accordance with one or more aspects of the disclosure.

FIG. 7 illustrates an example procedure 700 for object detection in images in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 108 of FIG. 1 that makes use of an object detection system, such as system 500 in FIG. 5, or object detection system 110 in FIG. 1. An object detection system implementing procedure 700 may be an independent application that has been installed on the computing device, a service hosted by a service provider that is accessible by the computing device, a plug-in module to the computing device, or combinations thereof.

An input image and a word-based concept are obtained (block 702). In one example, image module 144 obtains an input image and input condition module 146 obtains a word-based concept. Additionally or alternatively, image module 144 can obtain an input image and input condition module 146 can obtain a word-based concept as part of a training procedure in which a network is trained to detect objects in images. For instance, image module 144 can obtain an input image and input condition module 146 can obtain a word-based concept from the input image, such as by selecting one of a plurality of tags in the input image describing objects in the input image. In one example, image module 144 obtains an input image by receiving a user-supplied image. Additionally or alternatively, image module 144 obtains an input image by fetching an input image from a storage location, such as from a database of training images at a server, from storage 128, or combinations thereof.

An attention map is generated based on the input image and the word-based concept (block 704). The attention map includes pixels indicates presence values for the word-based concept within the input image. In one example, an image tagging network of attention map module 148 generates an attention map based on the input image and the word-based concept, the attention map including pixels indicates presence values for the word-based concept within the input image. Additionally or alternatively, each of the presence values indicates a respective presence of the word-based concept at a respective pixel of the input image, such as by indicating with a pixel value between 0 and 255 a presence value of an attention map in the range [−1,1].

In one example, the attention map is generated from an image tagging network trained from a first dataset of first images that include annotations without bounding boxes of objects in the first images. For instance, training module 154 may train an image tagging network with a first dataset of first images that include annotations without bounding boxes of objects in the first images.

A word embedding is generated based on the word-based concept, the word embedding describing relationships between the word-based concept and different word-based concepts (block 706). In one example, word embedding module 150 generates a word embedding based on the word-based concept, the word embedding describing relationships between the word-based concept and different word-based concepts.

Additionally or alternatively, generating the word embedding can include forming a vector from an Eigen decomposition of a matrix. The matrix can be constructed from co-occurrence probabilities of the word-based concept and the different word-based concepts.

The word embedding and the attention map are provided to respective layers of a conditional detection network (block 708). In one example, attention map module 148 provides the attention map and word embedding module 150 provides the word embedding as conditional inputs to a conditional detection network, such as a conditional detection network of detection module 152. For instance, the attention map may be provided to a different layer of the conditional detection network than the word embedding.

At least one region of the input image is detected by the conditional detection network based on the word embedding and the attention map (block 710). The at least one region includes a respective object corresponding to the word-based concept, the at least one region including a respective object corresponding to the word-based concept. In one example, a conditional detection network of detection module 152 detects at least one region of the input image based on the word embedding and the attention map, the at least one region including a respective object corresponding to the word-based concept. Additionally or alternatively, the conditional detection network is trained with a second dataset of second images that include annotations with respective bounding boxes of respective objects in the second images. For instance, training module 154 may train the conditional detection network with a second dataset of second images that include annotations with respective bounding boxes of respective objects in the second images.

In one example, the word embedding is provided to two layers of a conditional detection network, and the attention map is provided to a third layer of the conditional detection network, such as a conditional detection network that detects the at least one region of the input image. The third layer can be between the two layers of the conditional detection network. Additionally or alternatively, the two layers and the third layer can be included in a same convolutional stage of the conditional detection network. For instance, providing the word embedding and the attention map to the conditional detection network may include providing the attention map to a layer of the conditional detection network, and providing the word embedding to additional layers of the conditional detection network, the layer of the conditional detection network being between the additional layers of the conditional detection network.

In one example, the conditional detection network is trained with a dataset of images that include respective bounding boxes of respective objects in each of the images, the training including assigning a positive training label to detection outputs of the conditional detection network that substantially overlap with a ground truth one of the respective bounding boxes that corresponds to the word-based concept, and assigning a negative training label to other detection outputs of the conditional detection network that are not assigned a positive training label.

Additionally or alternatively, training the conditional detection network includes determining a negative class for the word-based concept, providing the negative class to the conditional detection network, and assigning a negative training label to detection outputs of the conditional detection network for the negative class that substantially overlap with a ground truth bounding box corresponding to the word-based concept.

In one example, training the conditional detection network includes setting the presence values of the attention map to ones, setting values of the word embedding to zeroes, and detecting respective regions of the input image for multiple objects of different word-based concepts.

Figure 8:
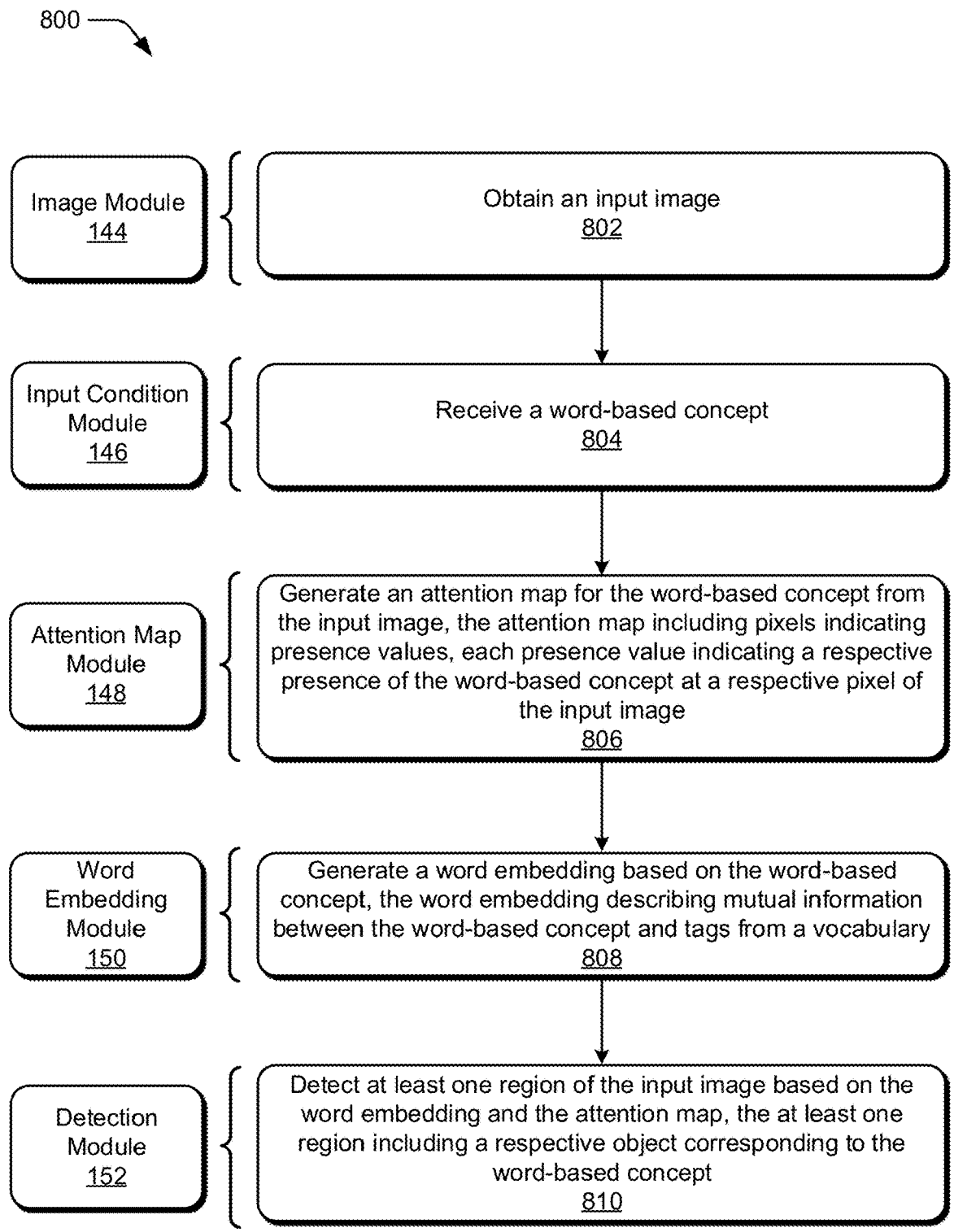
FIG. 8 illustrates a flow diagram depicting an example procedure in accordance with one or more aspects of the disclosure.

FIG. 8 illustrates an example procedure 800 for object detection in images in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 108 of FIG. 1 that makes use of an object detection system, such as system 500 in FIG. 5, or object detection system 110 in FIG. 1. An object detection system implementing procedure 800 may be an independent application that has been installed on the computing device, a service hosted by a service provider that is accessible by the computing device, a plug-in module to the computing device, or combinations thereof.

An input image is obtained (block 802). In one example, image module 144 obtains an input image. Image module 144 may obtain any suitable input image, such as a training image (e.g., an image used to train a network of an object detector), a user-supplied image that is not a training image, an image obtained to control a guidance system of a vehicle, an image obtained to control an environment in a vehicle (e.g., to adjust a temperature based on what people in the vehicle are wearing, to adjust a volume of an entertainment system at speakers directed to certain occupants of the vehicle, such as elderly or occupants with hearing aids, etc.), combinations thereof, and the like.

A word-based concept is received (block 804). In one example, input condition module 146 receives a word-based concept. For instance, a user may speak an input condition including a word-based concept, such as "wheel", which is received by input condition module 146 using a microphone, and synthesized to text with a speech recognition system of input condition module 146.

An attention map is generated for the word-based concept from the input image, the attention map including pixels indicating presence values, each presence value indicating a respective presence of the word-based concept at a respective pixel of the input image (block 806). In one example, attention map module 148 generates an attention map for the word-based concept from the input image, the attention map including pixels indicating presence values, each presence value indicating a respective presence of the word-based concept at a respective pixel of the input image, such as by setting a brightness of a pixel in the attention map to an integer between 0 and 255, inclusive, according to a presence value in a range of [−1,1].

In one example, an image tagging network of attention map module 148 generates an attention map. The image tagging network can be trained with training module 154 using a first dataset of first images that include annotations without bounding boxes of objects in the first images.

A word embedding is generated based on the word-based concept, the word embedding describing mutual information between the word-based concept and tags from a vocabulary (block 808). In one example, word embedding module 150 generates a word embedding based on the word-based concept, the word embedding describing mutual information between the word-based concept and tags from a vocabulary. Additionally or alternatively, a word embedding can be generated by decomposing a matrix and selecting at least part of one of the rows of a matrix constructed from the decomposition as the word embedding.

At least one region of the input image is detected based on the word embedding and the attention map, the least one region including a respective object corresponding to the word-based concept (block 810). In one example, detection module 152 detects at least one region of the input image based on the word embedding and the attention map, the least one region including a respective object corresponding to the word-based concept.

In one example, a conditional detection network of detection module 152 detects the at least one region. The conditional detection network may be trained with a training module (e.g., training module 154) using a second dataset of second images that include respective bounding boxes of respective objects in the second images. Additionally or alternatively, the second dataset can include the input image as one of the second images. In one example, the input image is not included in the first dataset or the second dataset. For instance, the input image may be user-supplied or automatically detected by an object detection system while the object detection system is operated in a client computing device, so that the input image may not be part of a dataset of training images.

Additionally or alternatively, word embedding module 150 provides the word embedding as conditional inputs to two layers of the conditional detection network, and attention map module 148 provides the attention map as an additional conditional input to a third layer of the conditional detection network. In one example, the two layers and the third layer are included in a same convolutional stage of the conditional detection network, and the third layer is between the two layers in the same convolutional stage.

In one example, the word embedding and the attention map are provided to respective layers of a conditional detection network, and the conditional detection network detects the at least one region of the input image. The respective layers may be included in a same convolutional stage of the conditional detection network. Additionally or alternatively, the attention map is provided to a layer of the conditional detection network between additional layers of the conditional detection network that are provided the word embedding.

Additionally or alternatively, detection results including the at least one region of the input image can be exposed in a user interface, such as by displaying an image with respective bounding boxes designating respective detected regions.

Figure 9:
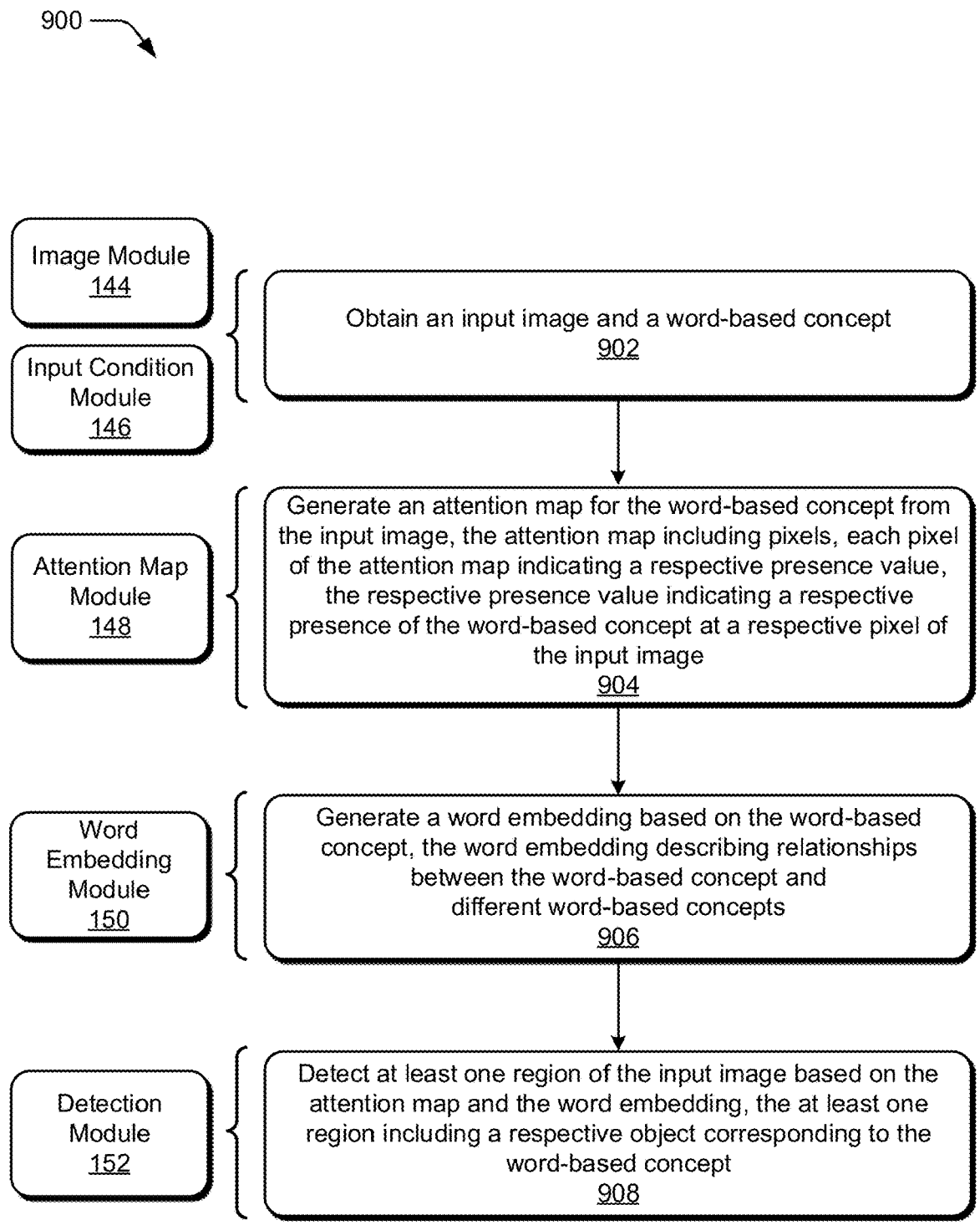
FIG. 9 illustrates a flow diagram depicting an example procedure in accordance with one or more aspects of the disclosure.

FIG. 9 illustrates an example procedure 900 for object detection in images in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 108 of FIG. 1 that makes use of an object detection system, such as system 500 in FIG. 5, or object detection system 110 in FIG. 1. An object detection system implementing procedure 900 may be an independent application that has been installed on the computing device, a service hosted by a service provider that is accessible by the computing device, a plug-in module to the computing device, or combinations thereof.

An input image and a word-based concept are obtained (block 902). In one example, image module 144 obtains an input image and input condition module 146 obtains a word-based concept. Image module 144 may obtain an input image in any suitable way, such as by receiving a user-supplied image, receiving automatically and without user intervention an image from an object detection system, such as a navigation system of an automobile, retrieving an image from storage (e.g., storage 128), retrieving an image from a database of training images (e.g., from server 108), combinations thereof, and the like.

An attention map is generated for the word-based concept from the input image, the attention map including pixels, each pixel of the attention map indicating a respective presence value, the respective presence value indicating a respective presence of the word-based concept at a respective pixel of the input image (block 904). In one example, attention map module 148 generates an attention map for the word-based concept from the input image, the attention map including pixels, each pixel of the attention map indicating a respective presence value, the respective presence value indicating a respective presence of the word-based concept at a respective pixel of the input image. Additionally or alternatively, the respective presence value can be greater than or equal to minus one and less than or equal to one.

A word embedding is generated based on the word-based concept, the word embedding describing relationships between the word-based concept and different word-based concepts (block 906). In one example, word embedding module 150 generates a word embedding based on the word-based concept, the word embedding describing relationships between the word-based concept and different word-based concepts.

In one example, generating the word embedding includes forming a vector from an Eigen decomposition of a matrix constructed from co-occurrence probabilities of the word-based concept and the different word-based concepts.

The attention map and the word embedding may be provided as conditional inputs to a conditional detection network, the attention map provided to a different layer of the conditional detection network than the word embedding. In one example, attention map module 148 provides the attention map and word embedding module 150 provides the word embedding as conditional inputs to a conditional detection network, such as a conditional detection network of detection module 152, the attention map provided to a different layer of the conditional detection network than the word embedding.

In one example, the word embedding is provided to two layers of a conditional detection network, and the attention map is provided to a third layer of the conditional detection network, such as a conditional detection network that detects the at least one region of the input image. The third layer can be between the two layers of the conditional detection network. Additionally or alternatively, the two layers and the third layer can be included in a same convolutional stage of the conditional detection network.

At least one region of the input image is detected based on the attention map and the word embedding, the at least one region including a respective object corresponding to the word-based concept (block 908). In one example, detection module 152 detects, with a conditional detection network based on the attention map and the word embedding, at least one region of the input image, the at least one region including a respective object corresponding to the word-based concept.

The procedures described herein constitute an improvement over procedures train systems without heterogeneous datasets and are limited to detecting objects of seen classes (e.g., classes existing in a training database). Rather, the procedures described herein include object detectors with image tagging networks and conditional detection networks that are trained using heterogeneous datasets with respect to one another, and can detect objects in images of both seen and unseen classes. An attention map and a word embedding for a target concept are provided as conditional inputs to the conditional detection network, so that the conditional detection network is image-label agnostic and concept-specific. Accordingly, despite the conditional detection network being trained with a training dataset having a small number of seen classes, it generalizes to novel, unseen classes by concept conditioning, since the word-based concept propagates through the conditional detection network via the conditional inputs and influences classification and region proposal. Hence, classes of objects that can be detected by object detectors are expanded by the procedures described herein, without the need to scale training databases to include additional classes, thus saving time and money.

Having considered example procedures in accordance with one or more implementations, consider now example systems and devices that can be utilized to practice the inventive principles described herein.

Example Systems and Devices

FIG. 10 illustrates an example system generally at 1000 that includes example computing devices 1002-1, 1002-2, 1002-3, 1002-4, and 1002-5 (collectively 1002) that is representative of one or more computing systems and devices that may implement the various techniques described herein. Computing devices 1002 can be any suitable computing device (e.g., user computing devices). Computing devices 1002 may be, for example, a user computing device (e.g., one of computing devices 104), or a server device, (e.g., server 108). Furthermore, computing device 1002 may include an on-chip system, multiple computing devices, combinations thereof, or any other suitable computing device or computing system. Accordingly, FIG. 10 illustrates computing devices 1002 as one or more of a tablet, a laptop computer, a smart phone, smart eye glasses, and a vehicle (e.g., a computing device of a vehicle), though these examples are illustrative and in no way are meant to limit the type or number of devices included in computing device 1002.

Furthermore, computing devices 1002 are coupled to "cloud" 1004 including platform 1006 that is representative of one or more computing systems and devices that may implement the various techniques described herein, such as servers, edge servers, global servers, or combinations thereof. This is illustrated through inclusion of object detection application 111, detection application 158, object detection system 110, image system 114, server 108, system 500, and system 600 in modules of platform 1006, which operate as described above.

Functionality of computing devices 1002 may be implemented all or in part through use of a distributed system, such as over a "cloud" 1004 via a platform 1006. Furthermore, platform 1006 may host data accessible by computing devices 1002, and therefore computing devices 1002 may be required to be authenticated to platform 1006.

Platform 1006 includes a processing system 1008, one or more computer-readable media 1010, and one or more I/O interfaces 1012 that are communicatively coupled to each other. Although not shown, platform 1006 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1008 is representative of functionality to perform one or more operations using hardware. Accordingly, processing system 1008 is illustrated as including hardware elements 1014 that may be configured as processors, functional blocks, and so forth. This may include implementation in hardware as an application specific integrated circuit or other logic device formed using one or more semiconductors. Hardware elements 1014 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 126 in FIG. 1 are examples of processing system 1008.

Computer-readable media 1010 (e.g., computer-readable storage media) is illustrated as including memory/storage 1016. Storage 128 in FIG. 1 is an example of memory/storage included in memory/storage 1016. Memory/storage component 1016 may include volatile media (such as random access memory (RAM)), nonvolatile media (such as read only memory (ROM), Flash memory, optical disks, magnetic disks, and so forth), or combinations thereof. Memory/storage component 1016 may include fixed media (e.g., RAM, ROM, a fixed hard drive, and so on) as well as removable media (e.g., Flash memory, a removable hard drive, an optical disc, and so forth). Computer-readable media 1010 may be configured in a variety of other ways as further described below.

Input/output interface(s) 1012 are representative of functionality to allow a user (e.g., a system administrator of platform 1006) to enter commands and information to platform 1006, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, platform 1006 may be configured in a variety of ways as further described below to support user interaction.

Platform 1006 also includes applications 1018. Applications 1018 are representative of any suitable applications capable of running on platform 1006, and may include a web browser which is operable to access various kinds of web-based resources (e.g., assets, media clips, images, content, configuration files, services, user profiles, advertisements, coupons, and the like. Applications 1018 include object detection application 112 and detection application 158, as previously described. Furthermore, applications 1018 includes any applications supporting object detection system 110, image system 114, system 500, or system 600.

Cloud 1004 includes and is representative of a platform 1006. Platform 1006 abstracts underlying functionality of hardware (e.g., servers) and software resources of cloud 1004, and includes resources 1020. Resources 1020 may include applications, data, services, and content that can be utilized while computer processing is executed on servers that are remote from computing devices 1002. Resources 1020 can also include services provided over the Internet, through a subscriber network, such as a cellular or Wi-Fi network, or combinations thereof.

Resources 1020 include detection network store 1022, which operates to provide one or more networks of an object detection system to one of computing devices 1002, such as networks that have been trained using heterogeneous training datasets. Resources 1020 also includes training dataset store, which operates to provide one or more training datasets of images that can be used to train an object detector as described herein.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by platform 1006. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the platform 1006, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1014 and computer-readable media 1010 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1014, or combinations thereof. Platform 1006 may be configured to implement particular instructions and functions corresponding to the software and hardware modules. Accordingly, implementation of a module that is executable by platform 1006 as software may be achieved at least partially in hardware, e.g., through use of computer-readable storage media and hardware elements 1014 of processing system 1008. The instructions and functions may be executable/operable by one or more articles of manufacture (for example, processing system 1008) to implement techniques, modules, and examples described herein.

CONCLUSION

In one or more implementations, a digital medium environment includes at least one computing device. Systems, techniques, and devices are described herein for detecting objects in images with object detectors trained using heterogeneous training datasets. A first training dataset is used to train an image tagging network to determine an attention map of an input image for a target concept, and a second training dataset is used to train a conditional detection network that accepts as conditional inputs the attention map and a word embedding of the target concept. Despite the conditional detection network being trained with a training dataset having a small number of seen classes (e.g., classes belonging to a training dataset), it generalizes to novel, unseen classes by concept conditioning, since the target concept is propagated through the conditional detection network via the conditional inputs, thus influencing classification and region proposal. Hence, classes of objects that can be detected by object detectors are expanded, without the need to scale training databases to include additional classes, thus saving time and money.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for detecting objects in digital images, a method implemented by a computing device, the method comprising:
   receiving a word-based concept and an input digital image that depicts a scene;
   generating a word embedding based on the word-based concept, the word embedding describing relationships between the word-based concept and different word-based concepts, the generating including forming a representation of a matrix constructed from co-occurrence probabilities of the word-based concept and the different word-based concepts; and
   generating an output digital image from the input digital image and the word embedding, the output digital image depicting the scene and including one or more bounding containers that denote regions of the scene that include one or more objects corresponding to the word-based concept.

2. The method as described in claim 1, wherein the generating the output digital image includes generating the output digital image with a conditional detection network of the computing device that is trained to detect the objects in the digital images that do not include the one or more objects corresponding to the word-based concept.

3. The method as described in claim 1, further comprising displaying the output digital image in a user interface of the computing device.

4. The method as described in claim 1, wherein the bounding containers include bounding boxes displayed on the scene.

5. The method as described in claim 1, wherein the receiving includes extracting the word-based concept from metadata of the input digital image.

6. The method as described in claim 1, wherein the receiving includes receiving the word-based concept as one or both of a spoken utterance or typed text.

7. The method as described in claim 1, further comprising:
   generating a feature map from the input digital image that represents features of the scene depicted in the input digital image;
   generating an attention map from the feature map and the word-based concept, the attention map including pixels indicating presence values for the word-based concept within the input digital image; and
   wherein the generating the output digital image is based on the attention map.

8. The method as described in claim 1, further comprising adjusting a focus system of a digital camera based on the one or more objects in the output digital image.

9. The method as described in claim 1, further comprising adjusting a guidance system of a self-driving car based on the one or more objects in the output digital image.

10. An object detection system implemented by a computing device in a digital medium environment, the object detection system comprising:
    a processing system; and
    at least one computer readable medium having instructions stored thereon that, responsive to execution by the processing system, cause the processing system to perform operations including:
       receiving a word-based concept and an input digital image that depicts a scene;
       generating a word embedding based on the word-based concept, the word embedding describing relationships between the word-based concept and different word-based concepts, the generating including forming a representation of a matrix constructed from co-occurrence probabilities of the word-based concept and the different word-based concepts; and
       generating an output digital image from the input digital image and the word embedding, the output digital image depicting the scene and including one or more bounding containers that denote regions of the scene that include one or more objects corresponding to the word-based concept.

11. The object detection system as described in claim 10, wherein the generating the output digital image includes generating the output digital image with a conditional detection network that is trained to detect objects in digital images that do not include the one or more objects corresponding to the word-based concept.

12. The object detection system as described in claim 10, wherein the operations include displaying the output digital image in a user interface of the computing device.

13. The object detection system as described in claim 10, wherein the operations include:
    generating a feature map from the input digital image that represents features of the scene depicted in the input digital image;
    generating an attention map from the feature map and the word-based concept, the attention map including pixels indicating presence values for the word-based concept within the input digital image; and
    wherein the generating the output digital image is based on the attention map.

14. The object detection system as described in claim 10, wherein the receiving includes at least one of:
    extracting the word-based concept from metadata of the input digital image;
    receiving the word-based concept as a spoken utterance; or
    receiving the word-based concept as typed text.

15. The object detection system as described in claim 10, wherein the bounding containers include bounding boxes displayed on the scene.

16. The object detection system as described in claim 10, wherein the operations include adjusting a guidance system of a self-driving car based on the one or more objects in the output digital image.

17. In a digital medium environment for detecting objects in digital images, a system comprising:
    means for generating a word embedding based on a word-based concept, the word embedding describing relationships between the word-based concept and different word-based concepts, the means for generating including forming a representation of a matrix constructed from co-occurrence probabilities of the word-based concept and the different word-based concepts;
    means for generating an attention map from an input digital image and the word-based concept, the attention map including pixels indicating presence values for the word-based concept within the input digital image; and
    means for generating an output digital image from the input digital image, the word embedding, and the attention map, the output digital image depicting a scene depicted by the input digital image and including one or more bounding containers that denote regions of the scene that include one or more objects corresponding to the word-based concept.

18. The system as described in claim 17, further comprising means for receiving the word-based concept in multiple modes of input.

19. The system as described in claim 17, wherein the means for generating the attention map includes means for generating a feature map from the input digital image that represents features of the scene depicted in the input digital image, and means for generating the attention map from the feature map and the word-based concept.

20. The system as described in claim 17, wherein the bounding containers include bounding boxes displayed on the scene.

\* \* \* \* \*